(12) United States Patent
Houlihan et al.

(10) Patent No.: US 8,914,499 B2
(45) Date of Patent: Dec. 16, 2014

(54) METHOD AND APPARATUS FOR EVENT CORRELATION RELATED TO SERVICE IMPACT ANALYSIS IN A VIRTUALIZED ENVIRONMENT

(75) Inventors: John Richard Houlihan, Round Rock, TX (US); Charles Glen Holden, Jr., Austin, TX (US); Ian McCracken, Austin, TX (US); Jean-Pierre Louis, Austin, TX (US); Philip Warren, Austin, TX (US)

(73) Assignee: Zenoss, Inc., Austin, TX (US)

( * ) Notice: Subject to any disclaimer, the term of this patent is extended or adjusted under 35 U.S.C. 154(b) by 388 days.

(21) Appl. No.: 13/396,702

(22) Filed: Feb. 15, 2012

(65) Prior Publication Data

US 2012/0215912 A1 Aug. 23, 2012

Related U.S. Application Data

(60) Provisional application No. 61/443,848, filed on Feb. 17, 2011.

(51) Int. Cl.
*G06F 15/167* (2006.01)
*G06F 9/50* (2006.01)

(52) U.S. Cl.
CPC ................... *G06F 9/5072* (2013.01)
USPC ........................................................ 709/224

(58) Field of Classification Search
CPC ......... H04L 41/00; H04L 43/04; H04L 43/08; G06F 9/5072; G06F 9/5061
USPC ............... 709/223, 224, 226; 705/7; 717/127; 370/252
See application file for complete search history.

(56) References Cited

U.S. PATENT DOCUMENTS

| | | | |
|---|---|---|---|
| 6,738,933 B2 | 5/2004 | Fraenkel et al. | |
| 7,251,584 B1 | 7/2007 | Perazolo et al. | |
| 7,516,362 B2 | 4/2009 | Connelly et al. | |
| 7,702,496 B1 | 4/2010 | Vijendra et al. | |
| 7,797,420 B1 | 9/2010 | Mackie et al. | |
| 7,826,597 B2 | 11/2010 | Berner et al. | |
| 8,230,056 B2 | 7/2012 | Bishop et al. | |
| 2002/0184368 A1* | 12/2002 | Wang | 709/226 |
| 2004/0024627 A1* | 2/2004 | Keener | 705/7 |
| 2005/0216585 A1* | 9/2005 | Todorova et al. | 709/224 |
| 2006/0167672 A1 | 7/2006 | Goldman et al. | |
| 2006/0179134 A1 | 8/2006 | Shemesh et al. | |
| 2006/0245369 A1* | 11/2006 | Schimmelpfeng et al. | 370/252 |
| 2007/0282692 A1* | 12/2007 | Bishop et al. | 705/26 |
| 2008/0114581 A1 | 5/2008 | Meir et al. | |
| 2008/0263388 A1 | 10/2008 | Allen et al. | |
| 2011/0055817 A1* | 3/2011 | Noble et al. | 717/127 |
| 2012/0158938 A1* | 6/2012 | Shimonishi et al. | 709/223 |
| 2012/0173927 A1 | 7/2012 | Rymeski et al. | |

* cited by examiner

*Primary Examiner* — Jungwon Chang
(74) *Attorney, Agent, or Firm* — Posz Law Group, PLC

(57) ABSTRACT

A computer processor device provides a dependency tree representing (i) relationships among all the infrastructure elements in a computer system that are related to delivery of a service by a computer system, and (ii) how the infrastructure elements interact with each other in a delivery of said service, wherein a state of an infrastructure element is impacted only by states among its immediately dependent infrastructure elements of the dependency tree. The computer processor device determines the state of the service by checking current states of infrastructure elements in the dependency tree that immediately depend from the service.

27 Claims, 27 Drawing Sheets

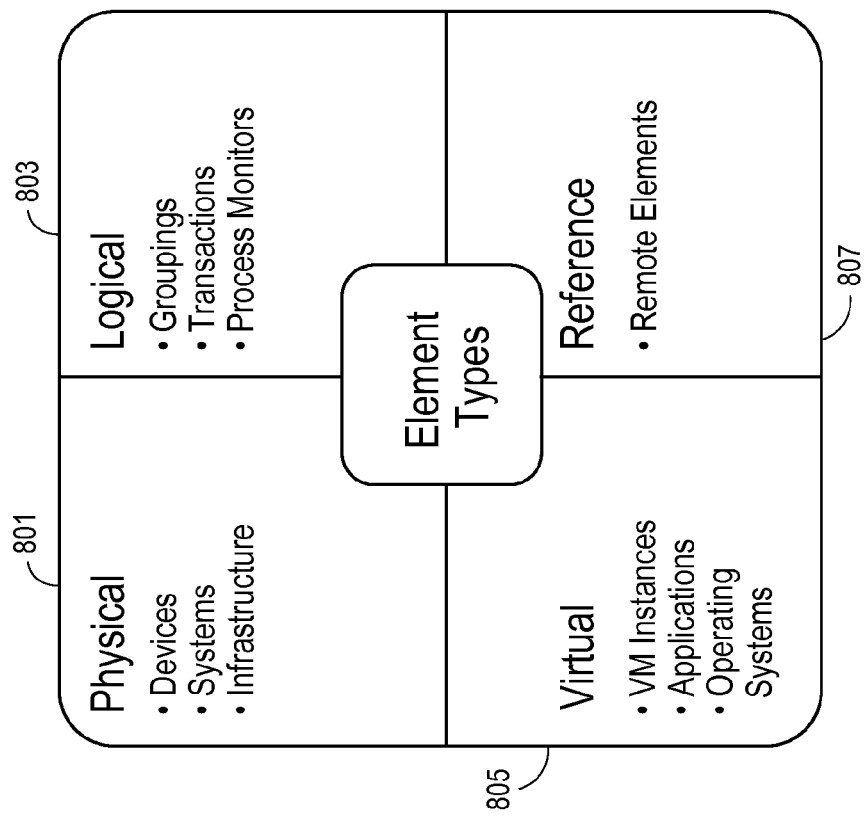

- Physical Elements represent the systems, infrastructure, and network devices which a service relies on.
  - Servers, Blades, Storage Arrays, Switches, etc.
- Logical Elements represent aspects of a service that must be measured or evaluated as a set to determine state
  - App Clusters, SLA Transactions, Health Monitors, etc.
- Virtual Elements consist of the software components that make up a service
  - OS and Application Instances, Virtual Machines
- Reference Elements provide a link to dependencies managed by an external instance of Zenoss or other management system capable of propagating state information to Zenoss
  - Enables scale through federated management of segmented or geographically dispersed data centers

FIG. 8

Dynamic Impact & Event Mangement
Service Management

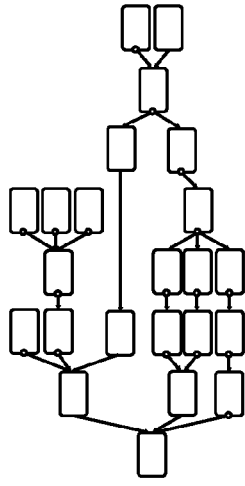

FIG. 10

Quickly represent a customer application as a managed object
- As simple as specifying devices and service dependencies
- Easy to extend with relationships such as clusters and load balanced web tiers
- Be precise where you need to be

Groups infrastructure components used by a customer application
- Uses Zenoss relationships to identify exactly what virtualization hosts, storage, and Cisco UCS server hardware is supporting the service
- Provided "swim lane" visualization for rapid undertanding
- Tracks infrastructure changes automatically and records change events
- Identifies potential hot spots

Understand service availability and infrastructure dependencies
- Rolls up dependency and infrastructure status and presents one view of service availability
- View status of every service element and supporting infrastructure device at once
- Impact view shows which customers depend on particular infrastructure components Dynamic Impact & Event Management
Root Cause

Service-specific notification
- Service-focused change events — status, membership, infrastructure
- Customers can register for the services they care about

Fast root cause identification
- Service status events include analyzed root cause
- Identifies failure to device or dependent service
- Infrastructure and dependency visualizations

Eliminates redundant alarms automatically
- Simplifies alarming with integrated masking, aggregation, and filtering
- Multiple availability checks per device with built-in windowing
- Notifies once on service status change instead of hundreds of times on individual device events

FIG. 11

Dynamic Impact & Event Mangement
Manage to service agreements

Define and manage service availability in customer terms
- Planned up times for applications  – 24x7, M-F 8-5, etc
- Service is up, degraded, or down

Notify customers at beginning and end of unexpected outages
- Builds satisfaction with effective communications

Provide regular reports
- Weekly, monthly, quarterly service availability reports
- Incident reports showing affected time and identifying incident root cause

FIG. 12

METHOD AND APPARATUS FOR EVENT CORRELATION RELATED TO SERVICE IMPACT ANALYSIS IN A VIRTUALIZED ENVIRONMENT

CROSS-REFERENCE TO RELATED APPLICATIONS

This application claims the benefit of the following provisional application: 61/443,848 filed 17 Feb. 2011, all of which is expressly incorporated herein by reference.

TECHNICAL FIELD

The present invention relates in general to data center management operations, and more specifically to handling events in a data center.

BACKGROUND

Complex data center environments contain a large number of infrastructure elements which interact to deliver services such as email, e-commerce, web, and a wide variety of enterprise applications. Failure of any component in the data center may or may not have an impact on service availability, capacity, or performance. Static mapping of infrastructure and application components to services is a well understood process, however the introduction of dynamic virtualized systems and cloud computing environments has created an environment where these mappings can change rapidly at any time.

Traditional systems such as EMC SMARTS or IBM NetCool have been designed to address Impact Analysis for services deployed in traditional fixed infrastructure data centers. In this environment dependencies are well known when policies are defined, and as such it is possible to define event patterns or "fingerprints" which have some impact on service availability, capacity, or performance.

The nature of dynamic data center environments facilitates rapid deployment of virtualized infrastructure or automated migration of virtual machines in response to fluctuating demand for application services. As a result traditional Impact Analysis and Service Assurance engines based on infrastructure "fingerprinting" break due to the fact that policies are not dynamically updated as service dependencies change.

Therefore, to address the above described problems and other problems, what is needed is a method and apparatus that obviates the need to have detailed knowledge of an entire dependency tree when determining service state at any given time.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 4 to FIG. 12 illustrate impact management.

FIG. 4 is an overview of a management suite.

FIG. 5 is an overview of dynamic event and impact management.

FIG. 7 is a relationship diagram illustrating impact management, elements, policies, and event flow.

FIG. 8 is a block diagram illustrating concepts relating to impact elements

FIG. 9 is a block diagram illustrating concepts relating to data centers and distributed impact management.

FIG. 10 illustrates a discussion of service management.

FIG. 11 illustrates a discussion of root cause for dynamic impact and event management.

FIG. 12 illustrates a discussion relating to manage to service agreements.

DETAILED DESCRIPTION

Figure 1:
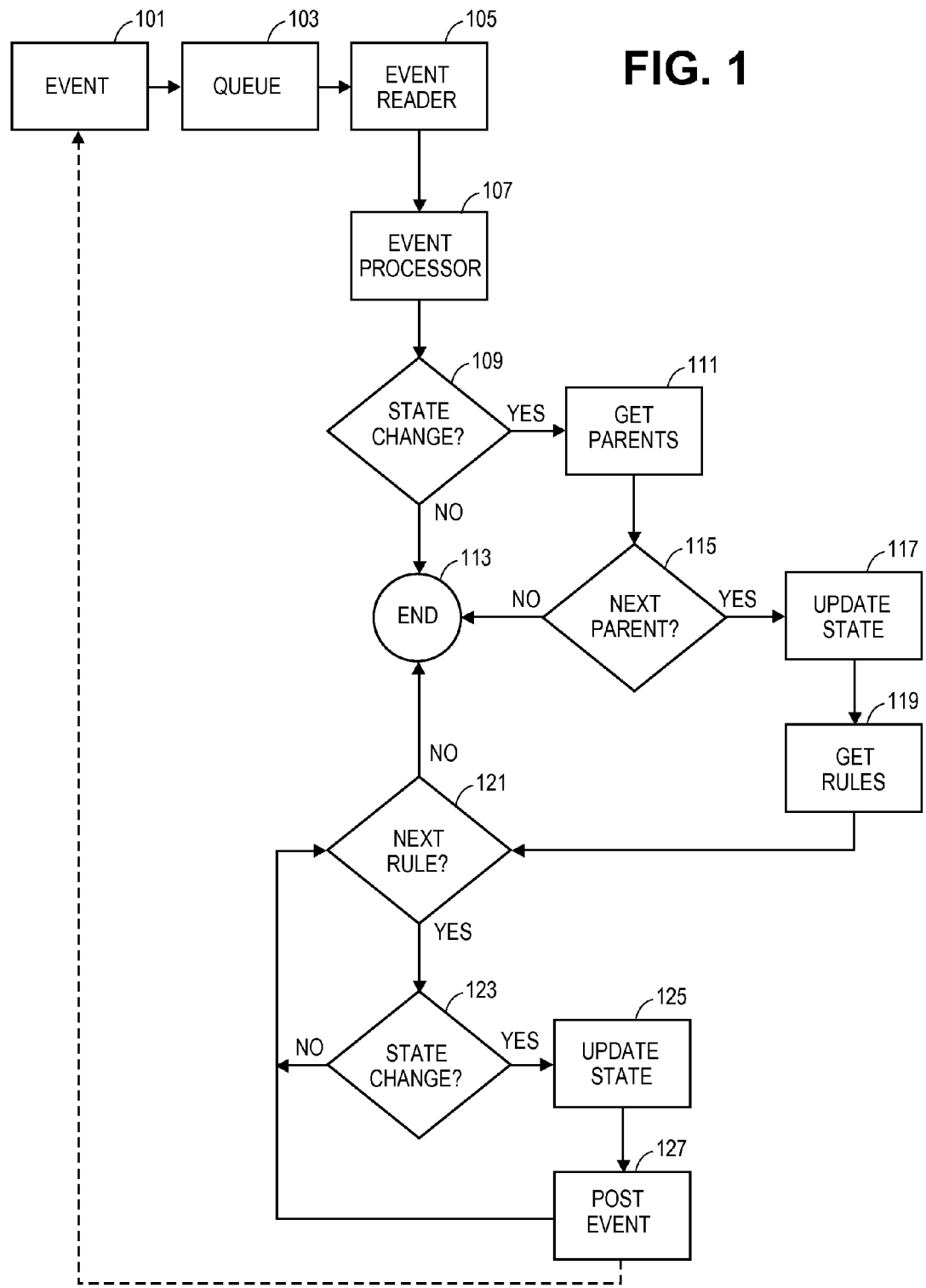
FIG. 1 is a flow chart illustrating a procedure for event correlation related to service impact analysis.

In overview, the present disclosure concerns data centers, typically incorporating networks running an Internet Protocol suite, incorporating routers and switches that transport traffic between servers and to the outside world, and may include redundancy of the network. Some of the servers at the data center can be running services needed by users of the data center such as e-mail servers, proxy servers, DNS servers, and the like, and some data centers can include, for example, network security devices such as firewalls, VPN gateways, intrusion detection systems and other monitoring devices, and potential failsafe backup devices. A data center can provide virtualized services in which details and the location of hardware is abstracted from users. More particularly, various inventive concepts and principles are embodied in systems, devices, and methods therein for supporting a virtualized data center environment.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

<Definitions>

The claims may use the following terms which are defined to have the following meanings for the purpose of the claims herein. However, other definitions may be provided elsewhere in this document.

"State" is defined herein as having a unique ID (that is, unique among states), a descriptor describing the state, and a priority relative to other states.

"Implied state" is the state of the infrastructure element which is calculated from its dependent infrastructure elements, as distinguished from a state which is calculated from an event that directly is detected by the infrastructure element and not through its dependent infrastructure element(s).

"Current state" is the state currently indicated by the infrastructure element.

"Absolute state" of the infrastructure element begins with the implied state of the infrastructure element (which is calculated from its dependent infrastructure elements), but the implied state is modified by any rules that the infrastructure element is attached to. The absolute state of an infrastructure element may be unchanged from the implied state if the rule does not result in a modification.

"Infrastructure element" is defined herein to mean a top level service, a physical element, a reference element, a virtual element, or a logical element, which is represented in the dependency graph as a separate element (data structure) with a unique ID (that is, unique among the elements in the dependency graph), is indicated as being in a state, has a parent ID and a child ID (which can be empty), and can be associated with rule(s).

"State change" is defined herein to mean a change from one state to a different state for one element, as initiated by an event; an event causes a state change for an element if and only if the element defines the event to cause the element to switch from its current state to a different state when the event is detected; the element is in only one state at a time; the state it is in at any given time is called the "current state"; the element can change from one state to another when initiated by an event, and the steps (if any) taken during the change are referred to as a "transition." An element can include the list of possible states it can transition to from each state and the event that triggers each transition from each state. An "

A "rule" is defined herein as being evaluated based on a collective state of all of the immediate children of the element to which the rule is attached.

"Synthetic transaction" or "synthetic test" means a benchmark test which is run to assess the performance of an object, usually being a standard test or trial to measure the physical performance of the object being tested or to validate the correctness of software, using any of various known techniques. The term "synthetic" is used to signify that the measurement which is the result of the test is not ordinarily provided by the object being measured. Known techniques can be used to create a synthetic transaction, such as measuring a response time using a system call.

<End of Definitions>

As further discussed herein below, various inventive principles and combinations thereof are advantageously employed to provide a hierarchical approach to Impact Analysis which obviates the need to have detailed knowledge of an entire dependency tree when determining service state at any given time. Further in accordance with exemplary embodiments, a policy method and system is provided which executes complex event processing related to data center management operations in a dynamic virtualized environment without the need for detailed understanding of an entire dependency chain.

Services and their dependency chain(s) such as those discussed above can readily be defined in a dependency tree using a tree representing all of the physical elements related to the delivery of the service itself. This dependency tree can be a graph showing the relationships of physical elements and how they interact with each other in the delivery of a given service.

The present inventors have noted that the implied state of a given element in the context of a given service is defined by the current state of the elements directly related to it. The use of the implied state of the element as its current state allows physical events which impact the absolute state of a given element to be rolled up through the other elements in a dependency graph using policies (which can be very simple) which determine the element state based on absolute calculations. For example, the determination of the element state using absolute calculations can be:

the element is down if any children are down,
the element is degraded if 50% of children are down
element is out of compliance if any child is out of compliance Similar other absolute calculations can be provided. Also, combinations of the absolute calculations can be used, for example, an element can be determined to be both down and out of compliance, or both degraded and out of compliance.

Using this approach it is possible to assign policies to elements themselves rather than define a policy for a service which would otherwise require a detailed knowledge of the entire dependency tree. Within the context of a given service this approach allows transient analysis of element state to rollup through a dependency graph only when that element exists within the dependency graph from the ultimate parent to the ultimate child. As the dependency graph changes due to the nature of dynamic data center operations the policy defining an element's state now moves with the element itself. This is a fundamental differentiator when compared to traditional approaches relying on defined event patterns to determine overall health of a service.

In traditional approaches, the EMC approach is to identify event patterns that indicate a particular condition. The user identifies, in advance, which event patterns are meaningful. The events are put into a queue, and when the sequence matches a pre-determined pattern, the user is notified of the event. IBM has developed IPL, a policy language which is very similar to object-oriented languages such as Java or C++, which allows a user to analyze events according to custom language which is coded using the IPL scripting language. This also requires the user to understand the potential impact of events on services at any given time, in advance of the event occurring.

The traditional approaches break down in a cloud computing environment, where resources are being adjusted in a dynamic data center operation, and virtual machines come and go an may not be running in the same place all the time. Infrastructure events that have a significant impact on a particular service at one time, may be irrelevant to that service even an hour later when the virtual machine or service component is no longer depending on that infrastructure.

A dependency graph can be constructed, which breaks down so that the state of a given piece of infrastructure is impacted only by its immediate dependencies. At the top level service, we do not care about the disk drive at the end of the chain, but instead only upon certain applications that immediately comprise the top level service; those applications are dependent on their servers on which they run; and their servers are dependent upon their respective drives and devices to which they are directly connected. If a state of a drive changes, e.g., it goes down, then the state of the drive as it affects its immediate parents is determined; as we roll up the dependency graph that change may (or may not) propagate to its parents; and so on up the dependency graph if the state change affects its parents.

Referring now to FIG. 1, a flow chart illustrating a procedure for event correlation related to service impact analysis will be discussed and described. FIG. 1 illustrates how policies can be defined using the approach described above. The procedure can advantageously be implemented on, for example, a processor of a computer system, described in connection with FIG. 13 and FIG. 14 or other apparatus appropriately arranged.

In FIG. 1, an event 101 is received into a queue 103. The event is associated with an element (see below). An event reader 105 reads each event from the queue, and forwards the event to an event processor.

The event processor 107 evaluates the event in connection with the current state of the element on which the event occurred. If the event does not cause a state change 109, then processing ends 113. If the event causes a state change 109, the processor gets the parents 111 of the element. If there is no parent of the element 115, then processing ends 113. However, if there is a parent of the element 115, then the state of the parent element is updated 117 based on the event (state change at the child element), and the rules for the parent element are obtained 119. If there is a rule 121, and when the state changed 123 based on the event, then the state of the parent element is updated 125 and an event is posted 127 (which is received into the event queue). If there is no state change 123, then the system proceeds to obtain any next rule 121 and process that rule also. When the system is finished processing 121 all of the rules associated with the element and its parent(s), then processing ends 113. Furthermore, all of the events (if any) caused by the state change due to the present event are now in the queue 103 to be processed.

Figure 2:
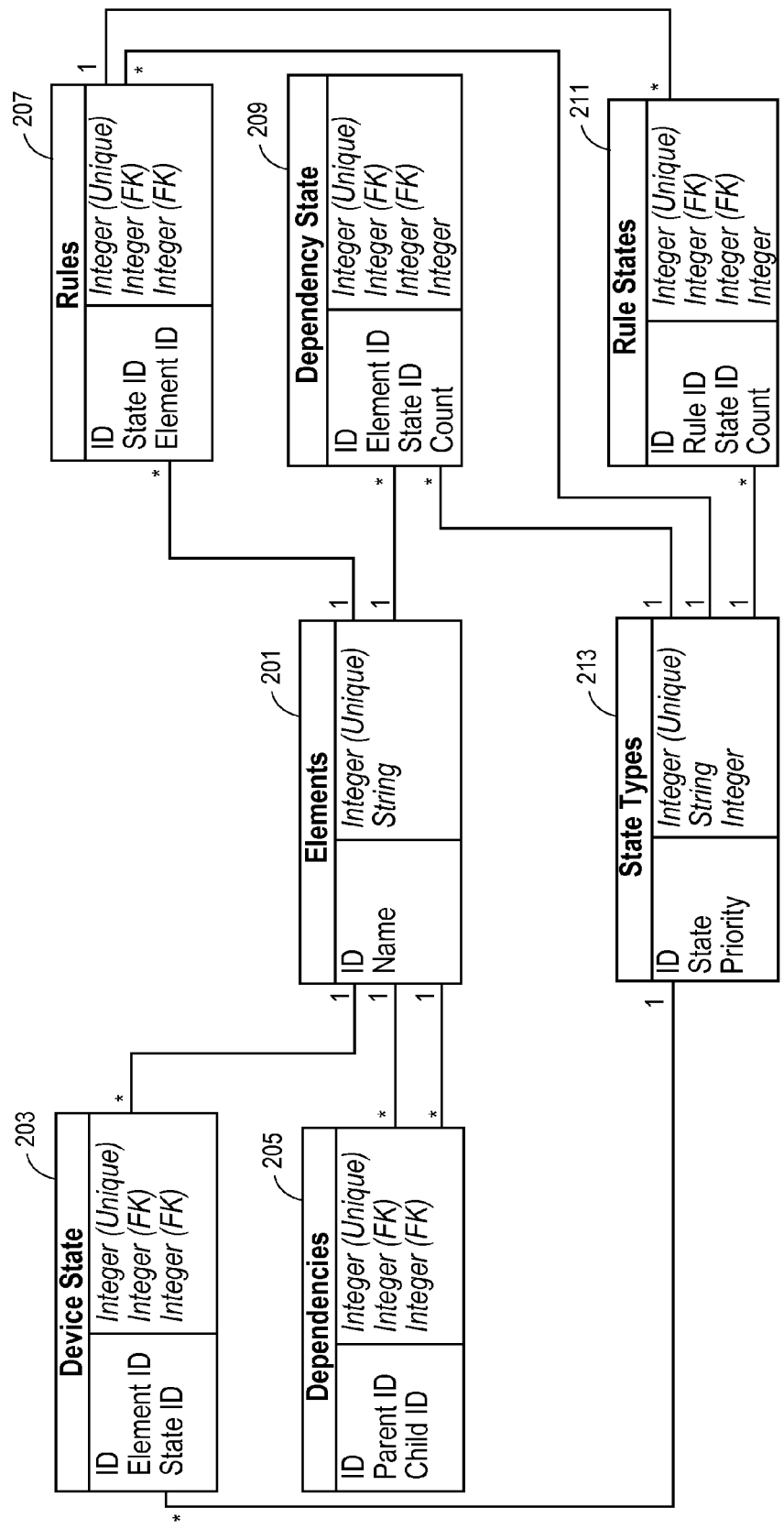
FIG. 2 is a relational block diagram illustrating a structure to contain and analyze element and service state.

Referring now to FIG. 2, a relational block diagram illustrating a "dependency chain" structure to contain and analyze element and service state will be discussed and described. FIG. 2 illustrates a relational structure that can be used to contain and analyze element and service state. A "dependency chain" is sometimes referred to herein as a dependency tree or a dependency graph.

The Element 201 has a Device State 203, Dependencies 205, Rules 207, and Dependency State 209. The Rules 207 have Rule States 211 and State Types 213. The Dependency State 209 has State Types 213. The Device State 203 has State Types 213.

As illustrated in FIG. 2, the Element 201 in the dependency chain has a unique ID (that is, unique to all other elements) and a name. The Rules 207 have a unique ID (that is, unique to all other rules), a state ID, and an element ID. The Dependency State 209 has a unique ID (that is, unique to all other dependency states), an element ID, a state ID, and a count. The State Type 213 has a unique ID (that is, unique to all other state types), a state (which is a descriptor, e.g., a string), and a priority relative to other states. The Rule States 211 has a unique ID (that is, unique to all other rule states), a rule ID, a state ID, and a count. The Device State 203 has a unique ID (that is, unique to all other device states), an element ID, and a state ID. The Dependencies 205 has a unique ID (that is, unique to all other dependencies), a parent ID, and a child ID.

In the Dependencies 205, the parent ID and the child ID are each a field containing an Element ID for the parent and child, respectively, of the Element 201 in the dependency chain. By using the child ID, the child can be located within the elements and the state of the child can be obtained.

The Device State 203 indicates which of the device states are associated with the Element 201. States can be user-defined. They can include, for example, up, down, and the like.

The Rules 207 indicates the rules which are associated with the Element 201. The rules are evaluated based on the collective state of all of the immediate children of the current element.

The Dependency State 209 indicates which of the dependency states are associated with the Element 201. This includes the aggregate state of all of the element's children.

The Rule States 211 indicates which of the rules states are associated with one of the Rules 207.

The State Types 213 table defines the relative priorities of the states. This iterates the available state conditions, and what priority they have against each other. For example, availability states can include "up", "degraded" and "down"; when "down" is a higher priority than "up" or "degraded", then the aggregate availability state of collective child elements having "up", "degraded" and "down" is "down." A separate "compliance" state can be provided, which can be "in compliance" or "out of compliance". Accordingly, an element can have different types of states which co-exist, e.g., both an availability state and a compliance state.

Figure 3:
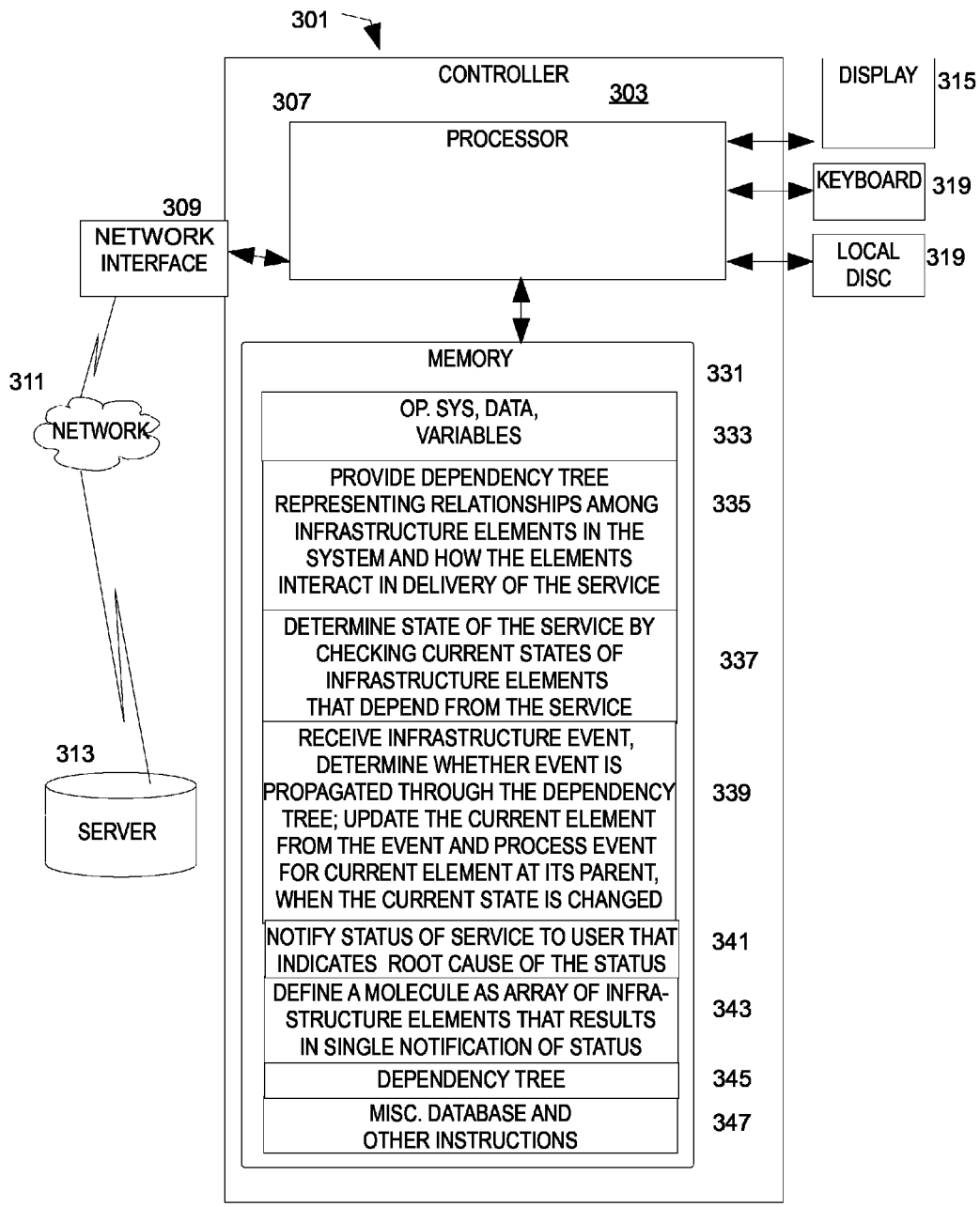
FIG. 3 is a block diagram illustration portions of a computer system.

Referring now to FIG. 3, a block diagram illustration portions of a computer system will be discussed and described. A computer system may include a computer 301, a network 311, and one or more remote device and/or computers, here represented by a server 313. The computer 301 may include one or more controllers 303, one or more network interface 309 for communication with the network 311 and/or one or more device interfaces (not shown) for communication with external devices such as represented by local disc 319. The controller may include a processor 307, a memory 331, a display 315, and/or a user input device such as a keyboard 319. Many elements are well understood by those of skill in the art and accordingly are omitted from this description.

The processor 307 may comprise one or more microprocessors and/or one or more digital signal processors. The memory 331 may be coupled to the processor 307 and may comprise a read-only memory (ROM), a random-access memory (RAM), a programmable ROM (PROM), and/or an electrically erasable read-only memory (EEPROM). The memory 331 may include multiple memory locations for storing, among other things, an operating system, data and variables 333 for programs executed by the processor 307; computer programs for causing the processor to operate in connection with various functions; a database in which the dependency tree 345 and related information is stored; and a database 347 for other information used by the processor 307. The computer programs may be stored, for example, in ROM or PROM and may direct the processor 307 in controlling the operation of the computer 301.

Programs that are stored to cause the processor 307 to operate in various functions such as to provide 335 a dependency tree representing relationships among infrastructure elements in the system and how the elements interact in delivery of the service; to determine 337 the state of the service by checking current states of infrastructure elements that depend from the service; to receive 339 infrastructure events, determine whether the event is to be propagated through the dependency tree element-by-element, update the current element from the event and process the event for the current element at its parent when the current state is changed; to notify 341 the status of the service to a registered user, together with an indication of the root cause of the status; and to define 343 a molecule as an array of infrastructure elements that results in a single notification of the status. These functions are described herein elsewhere in detail and will not be repeated here.

The user may invoke functions accessible through the user input device, e.g., a keyboard 319, a keypad, a computer mouse, a touchpad, a touch screen, a trackball, or the like.

Automatically upon receipt of an event from a physical device (such as local disc 319 or server 313), or automatically upon receipt of certain information via the network interface 309, the processor 307 may process the infrastructure event as defined by the dependency tree 345.

The display 315 may present information to the user by way of a conventional liquid crystal display (LCD) or other visual display, and/or by way of a conventional audible device (e.g., a speaker) for playing out audible messages. Further, notifications may be sent to a user in accordance with known techniques, such as over the network 311 or by way of the display 315.

FIG. 4 to FIG. 12 illustrate impact management.

Figure 4:
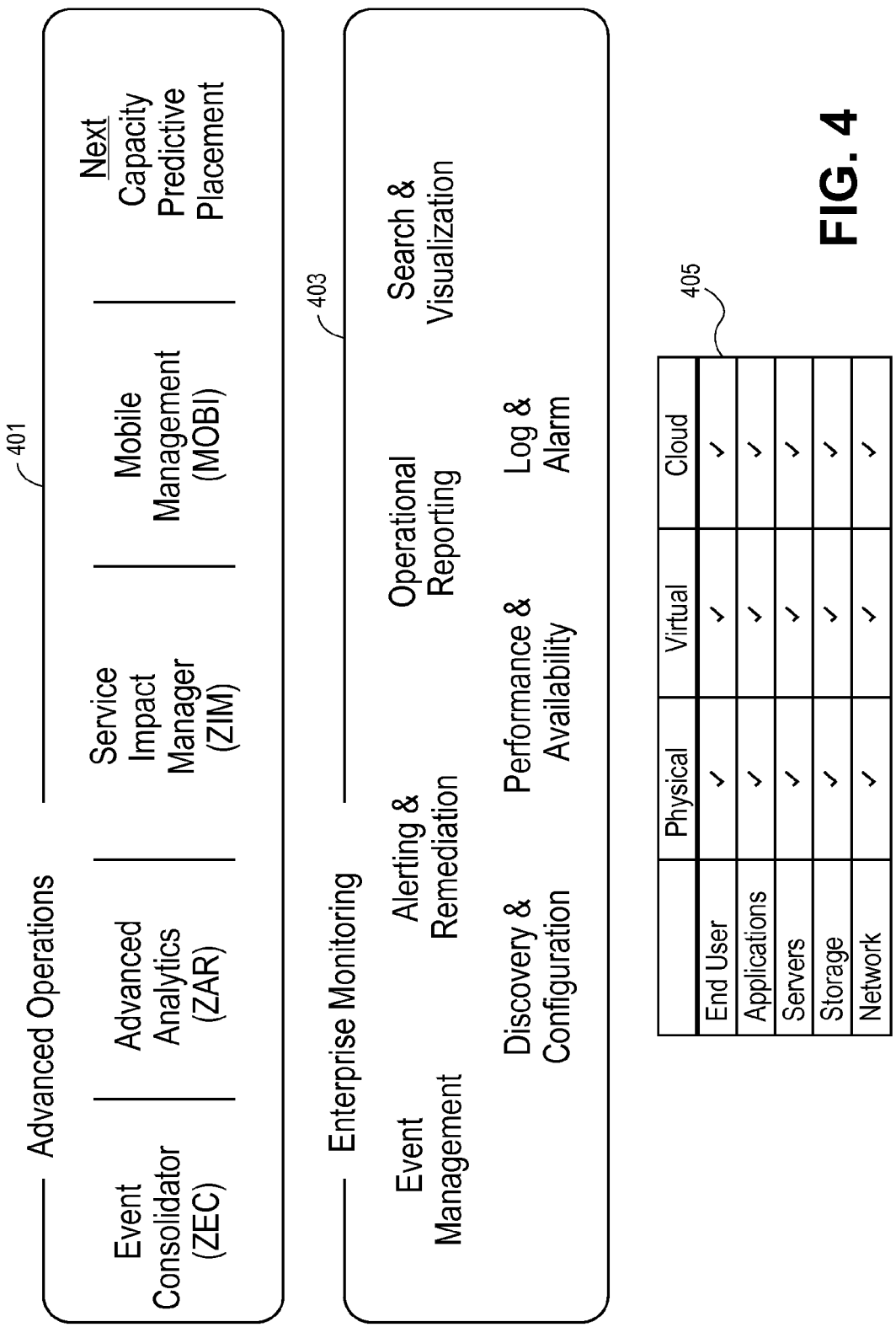

Referring now to FIG. 4, an overview of a management suite will be discussed and described. This is a high level view showing an example of uses of the present method and system disclosed herein. FIG. 4 illustrates that the management suite discussed herein can be used for "Advanced operations" 401 such as an event consolidator (ZEC), for advanced analytics (ZAR), for service impact manager (ZIM), for mobile management (MOBI), and for Capacity Predictive Placement. FIG. 4 also illustrates that the management suite discussed herein can be used for "enterprise monitoring" 403 such as event management, alerting and remediation, operational reporting, search and visualization, discovery and configuration, performance and availability, and log and alarm. Also, the management suite can be used for any combination of physical, virtual, and cloud embodiments 405 of the end user, applications, servers, storage, and/or network.

Figure 5:
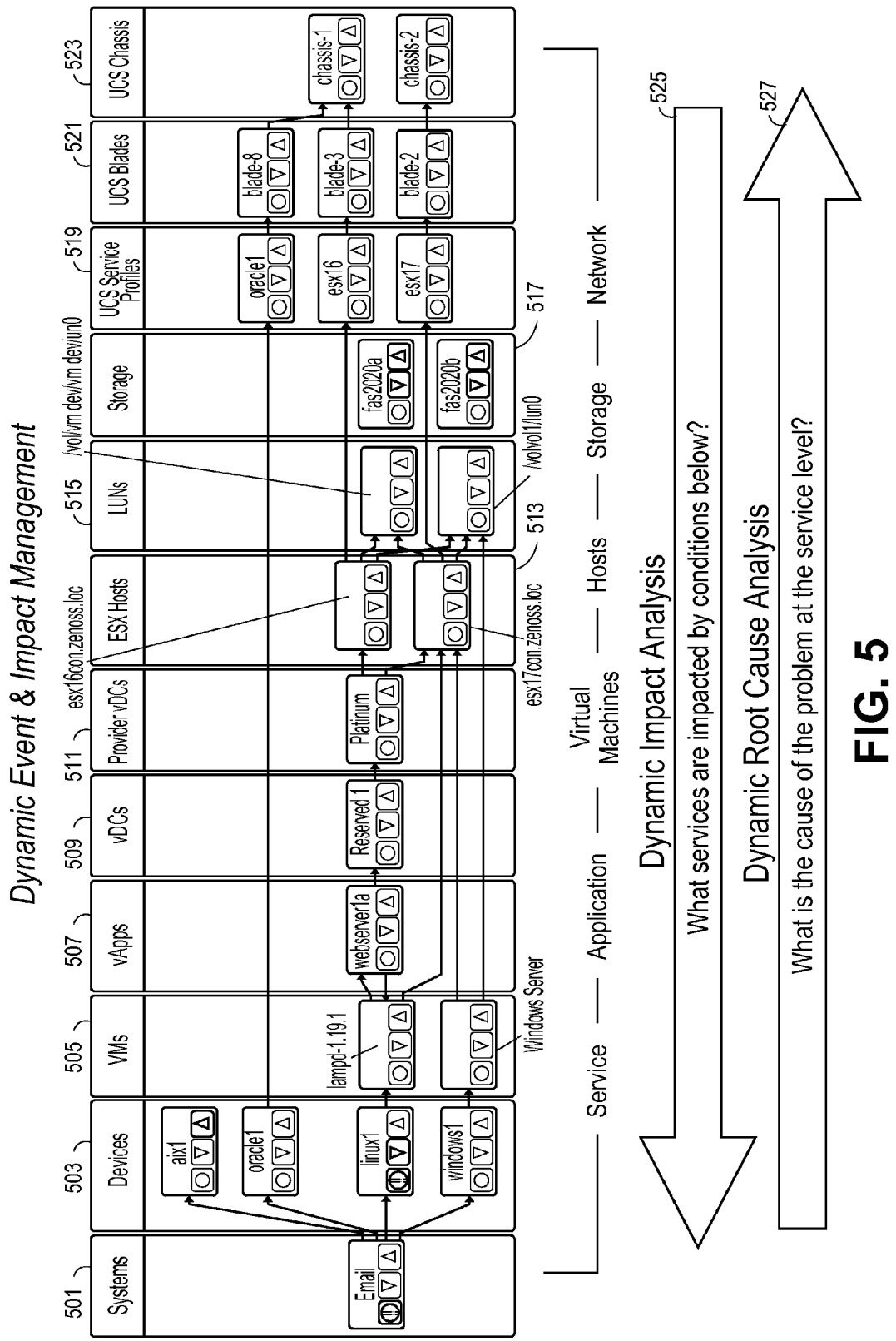

Referring now to FIG. 5, an overview of dynamic event and impact management will be discussed and described. This demonstrates the relational structure and the dynamic view format. As an alternative, reference is made to FIG. 15 showing an impact graph (discussed below).

Generally, there is a hierarchy from left to right of: service, application, virtual machine(s), host(s), storage, and network. FIG. 5 illustrates systems 501, devices 503, virtual machines (VMs) 505, virtual apps (vApps) 507, virtual DCs (vDCs) 509, Provider vDCs 511, ESX Hosts 513, LUNs 515, Storage 517, UCS Service Profiles 519, UCS Blades 521, and UCS Chassis. The up and down arrows indicate states of "up" and "down", respectively, and the circle/slash indicates "downgraded".

In this example, there is one system 501, "email", which can be representative of one or more different systems. The email system depends on four devices 503, aix1, oracle 1, linux1, and windows1. Some of the devices 503 (linux1 and windows1) depend on virtual machines 505 lampd-1.19.1 and Windows Service. One of the virtual machines 505 (lampd-1.19.1) depends one a vApp 5-7 (webserver1a), which depends on a vDC 509 (Reserved 1), which depends on a Provider vDC 511 (Platinum), which depends on two ESX hosts 513. Also, the other one of the virtual machines 505 (Windows Server) depends on the two ESX hosts 513. The ESX hosts 513 depend on LUNs 515 and on UCS Service Profiles 519. The UCS Service Profiles 519 depend on UCS Blades 521. The UCS Blades 521 depend on UCS Chassis 523.

As illustrated in FIG. 5, a dynamic impact analysis 525 can answer the question, what services are impacted by conditions below. Also, a dynamic root cause analysis 527 can answer the question, what is the cause of the problem at the service level.

Referring now to FIG. 6A to FIG. 6M, relationship diagrams of dependency chains and states showing impact management will be discussed and described. These figures for this example are sequential. This example illustrates a standard e-mail service 601 deployed on top of several applications. There is an MSSQL service 603, an exchange service 605 for the e-mails, and an LDAP server 607 for user authentication. This is a type of work-flow illustration of how this works in the real world.

Figure 6A:
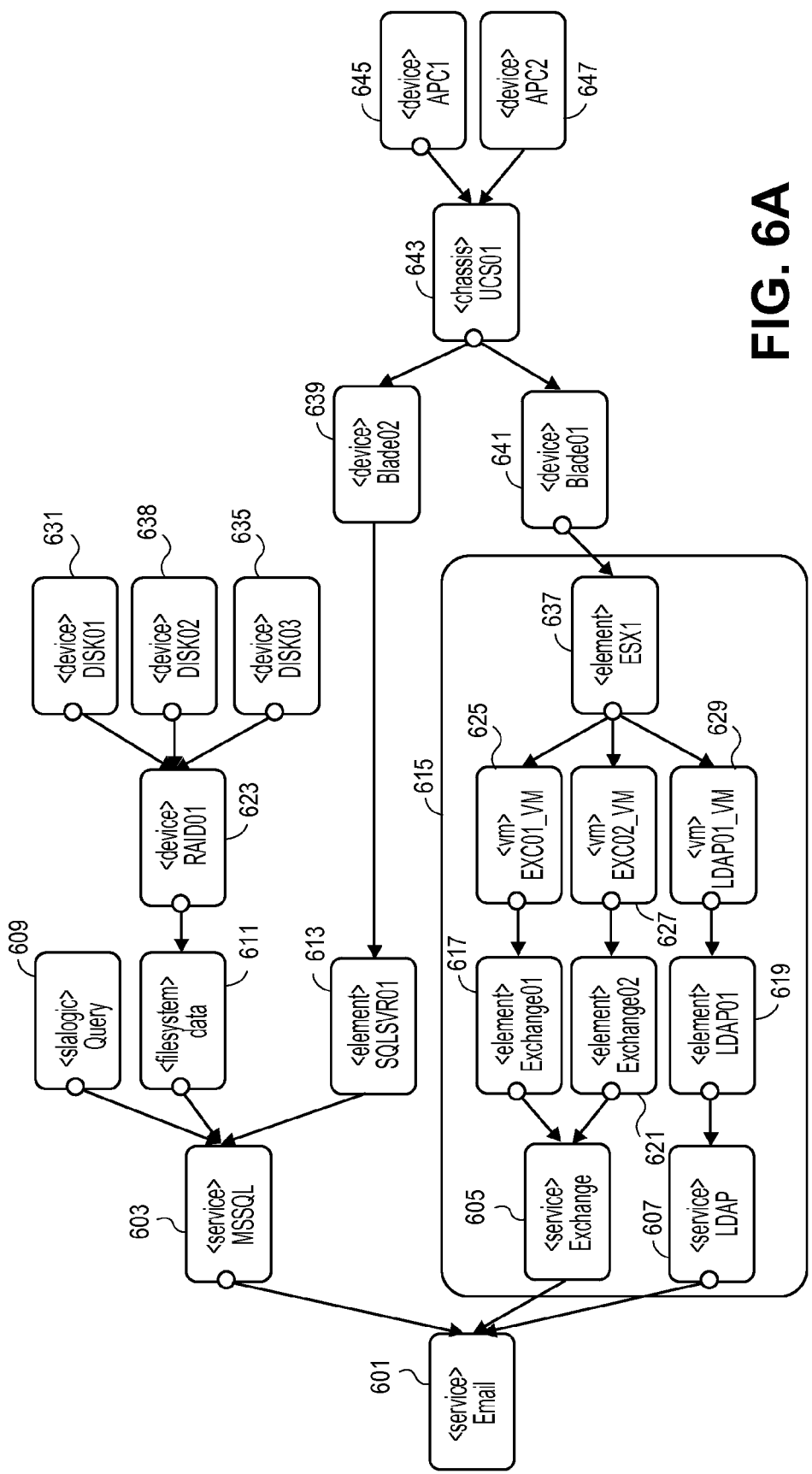
FIG. 6A to FIG. 6M are relationship diagrams of dependency chains and states showing impact management.
Figure 6B:
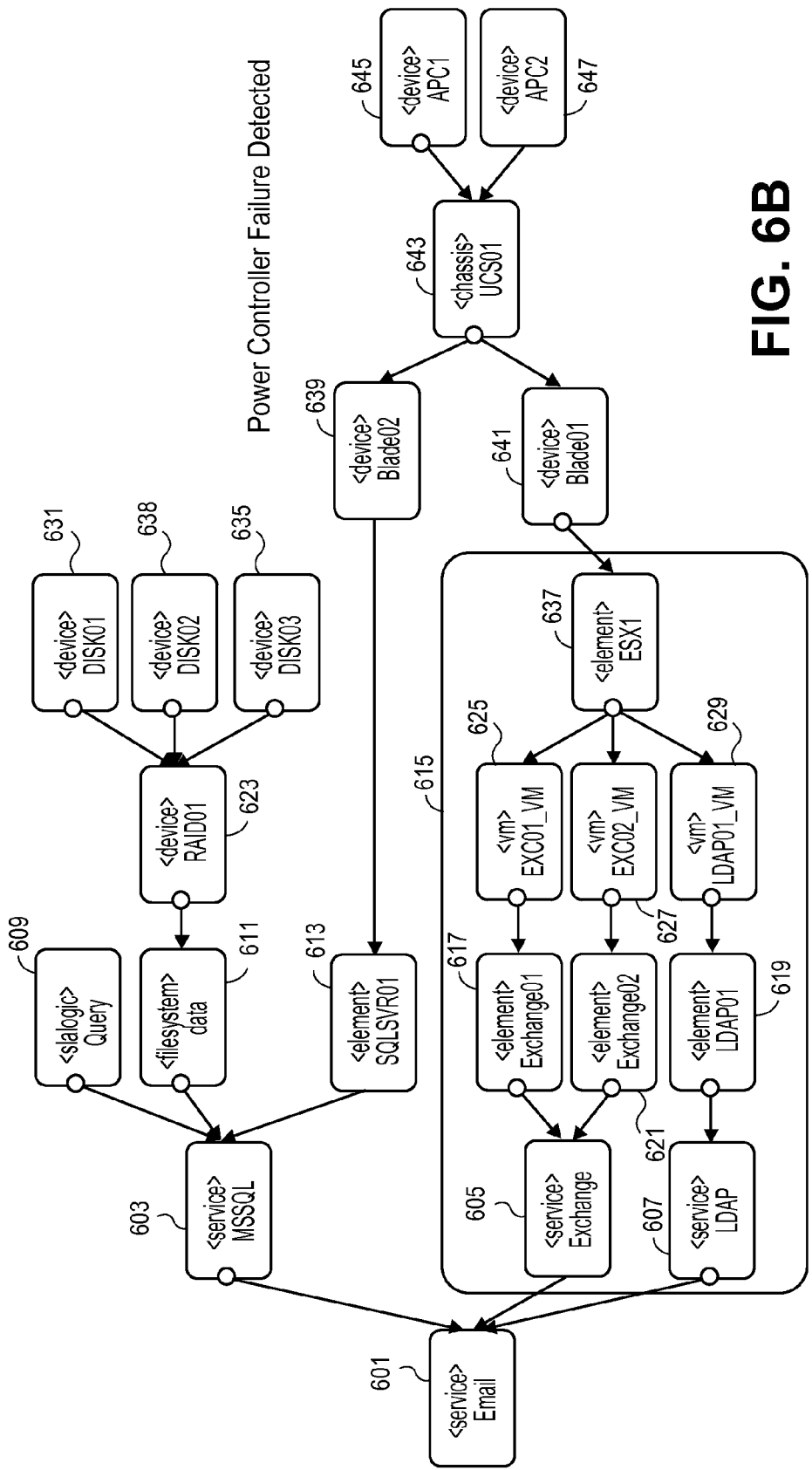

In this example, a power controller failure is detected on the UCS chassis 643 (FIG. 6B). That power controller failure event propagates up the dependency tree (parent is illustrated to the left in this figure) through Blade02 blade device 639, SQLSVR element 613, MSSQL service 603, to Email service 601; and through Blade01 device 641; to element ESX1 637; to virtual machines EXC01, EXC02, and LDAP01 625, 627, 629; to elements Exchange01, Exchange02, and LDAP01 617, 621, 619; to services Exchange 605 and LDAP 607, and then to service Email 601.

Figure 6C:
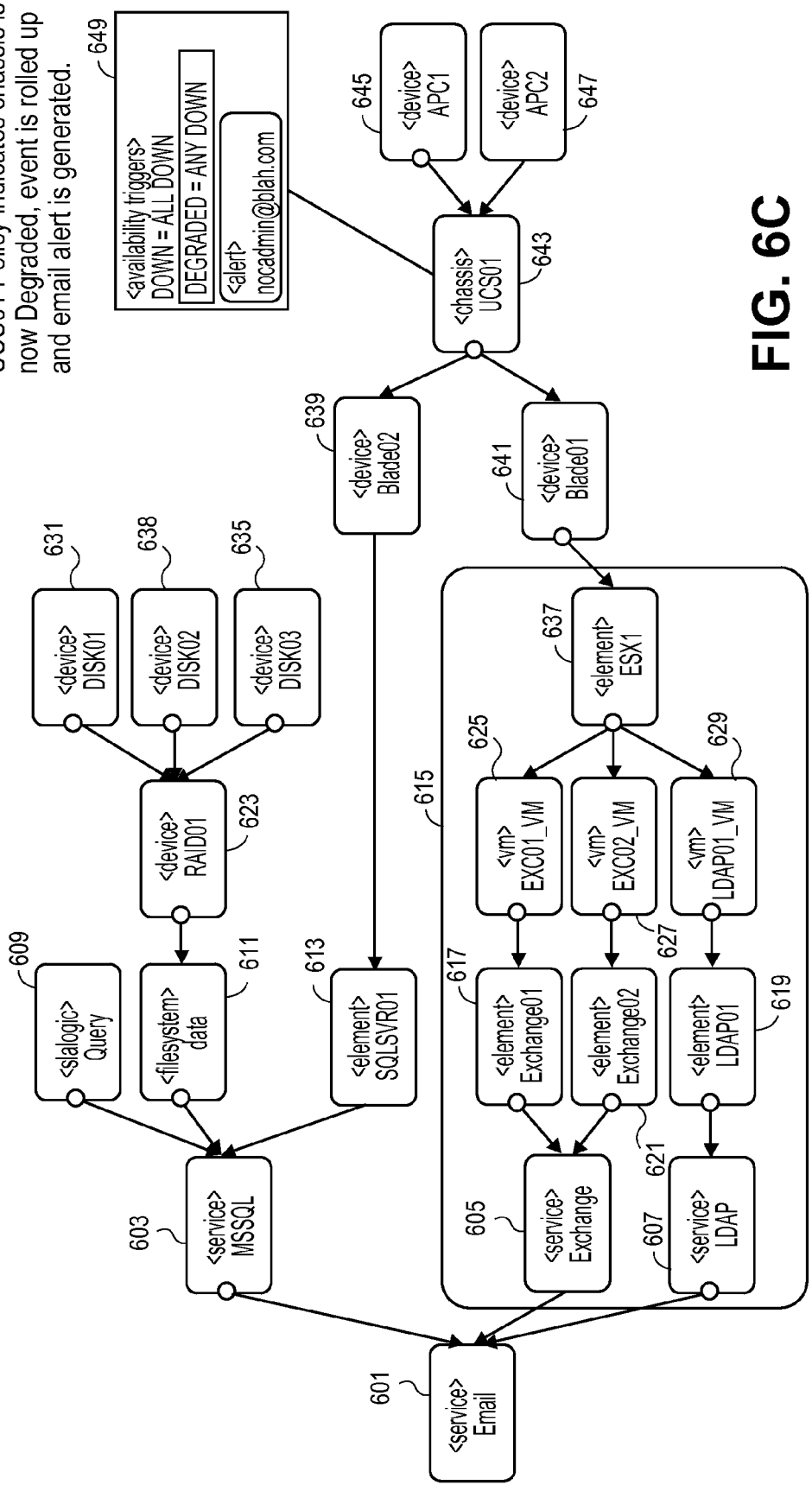

In FIG. 6C, note the UCS01 policy rule which is defined on the UCS01 chassis element 643 says that, if any of the UCS01 element children 645, 647 are down, then the UCS01 Element 643 is considered degraded. Accordingly, the power controller failure causes a state change of the chassis 643 in the UCS01 Element to degraded. An e-mail alert is generated per the policy rule and sent to the NOC indicating that the chassis is in a UCS01 element is in a "degraded" condition. The UCS chassis has changed state 643. Then, the parents are identified. In this illustration, two blade servers 639, 641 are identified as parents.

Figure 6D:
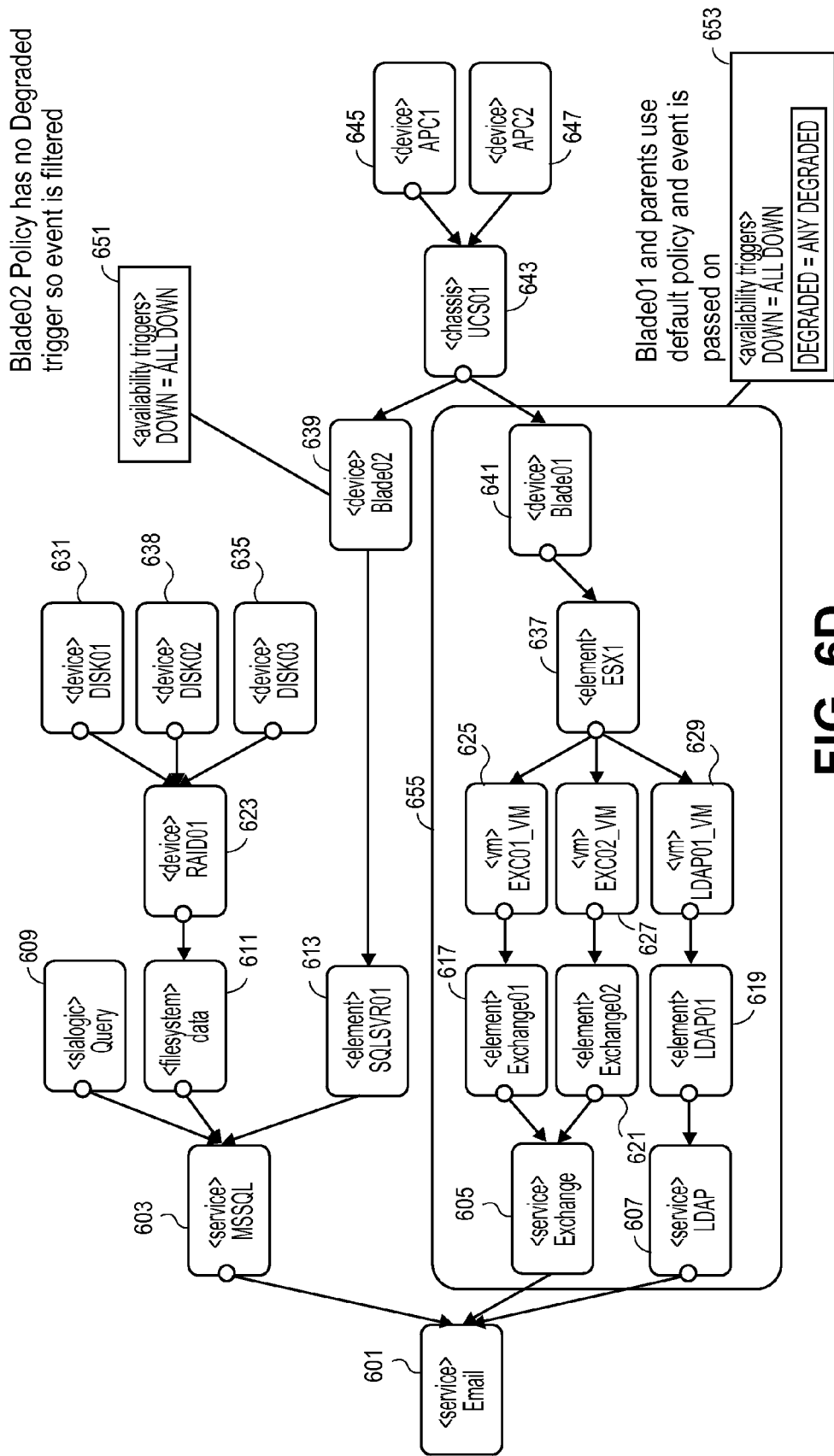

As shown in FIG. 6D, blade02 639 has a policy that it is "down" only if all of its immediate children are down. The event is filtered, i.e., does not roll further up the chain or cause rule evaluation or cause a notification, because the state of Blade02 639 does not change since all of its children are not down; in fact, its child UCS01 chassis 643 is merely "degraded."

Also as shown in FIG. 6D, blade01 641 has a policy that it is "degraded" if any of its immediate children are "degraded". In FIG. 6D, the box around Blade01 641 and its parent elements ESX1 637, etc. indicates that every element in that boxed-in tree 655 uses the same policy and consequently the event is passed on up the boxed-in tree (referred to herein as a "molecule" 655) up to the top level subservices. That is, the event rolls up through the ESX host 637, aggregated up to the exchange service 605, as well as forwarded out to the LDAP service 607 at the top of the molecule 655. The effect of this molecular policy is that there is aggregation, filtering and mass handling of events through the boxed-in tree, and the user is not flooded with notifications and messages regarding the events. Instead, the molecular policies 653 aggregate, filter, and mass the events and shield the user from these notifications and perform a triage on those events that are firing up through the power control structure resulting from this power controller failure at the bottom end.

Figure 6E:
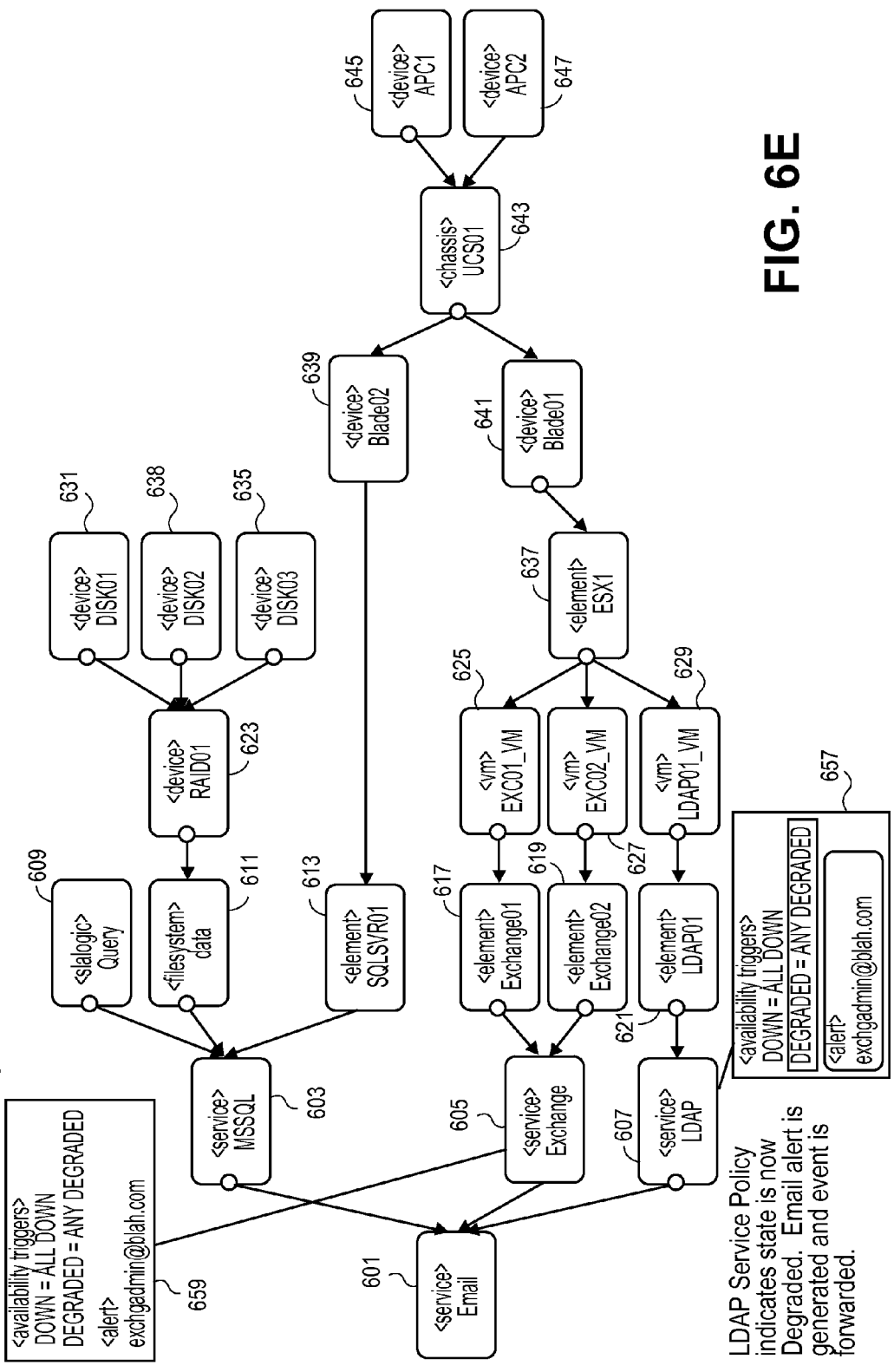

In FIG. 6E, there is an exchange cluster server 605, with two exchange servers 617, 619 in cluster mode. In this case, there is no policy 659 violation caused by the event because in order to be degraded, at least one child must be down, which has not happened in this example. The event is filtered here, not sent up to the e-mail server 601, and no alert is generated, because there is no state change to the Exchange Cluster 605.

The LDAP server 607, however, is considered degraded because of its policy 657 which states that the LDAP server element 607 is degraded if any of its children are degraded. Consequently, the event at its child 621 causes a state change at the LDAP server element 607, and per the LDAP server's policy an e-mail alert is generated and the event (that the LDAP server is degraded) is forwarded to the event queue for further processing.

Figure 6F:
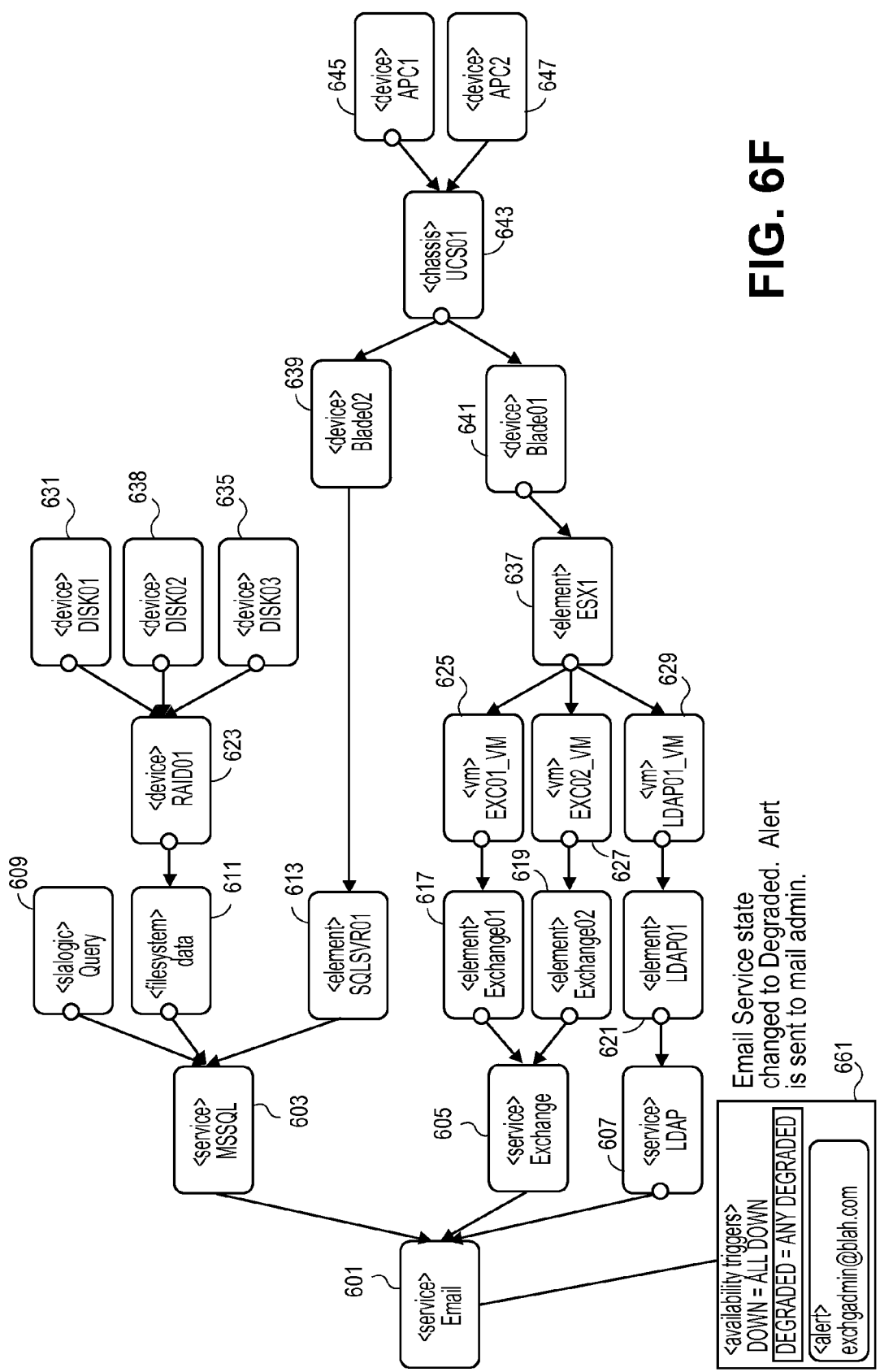

In FIG. 6F, at the top level with the E-mail Service 601, there is a policy 661 violation and the E-mail Service element's state is changed to "degraded" because it has a policy 661 that says it is degraded if any of its children are degraded. A notification is sent to the service administrator, per the policy 661.

Figure 6G:
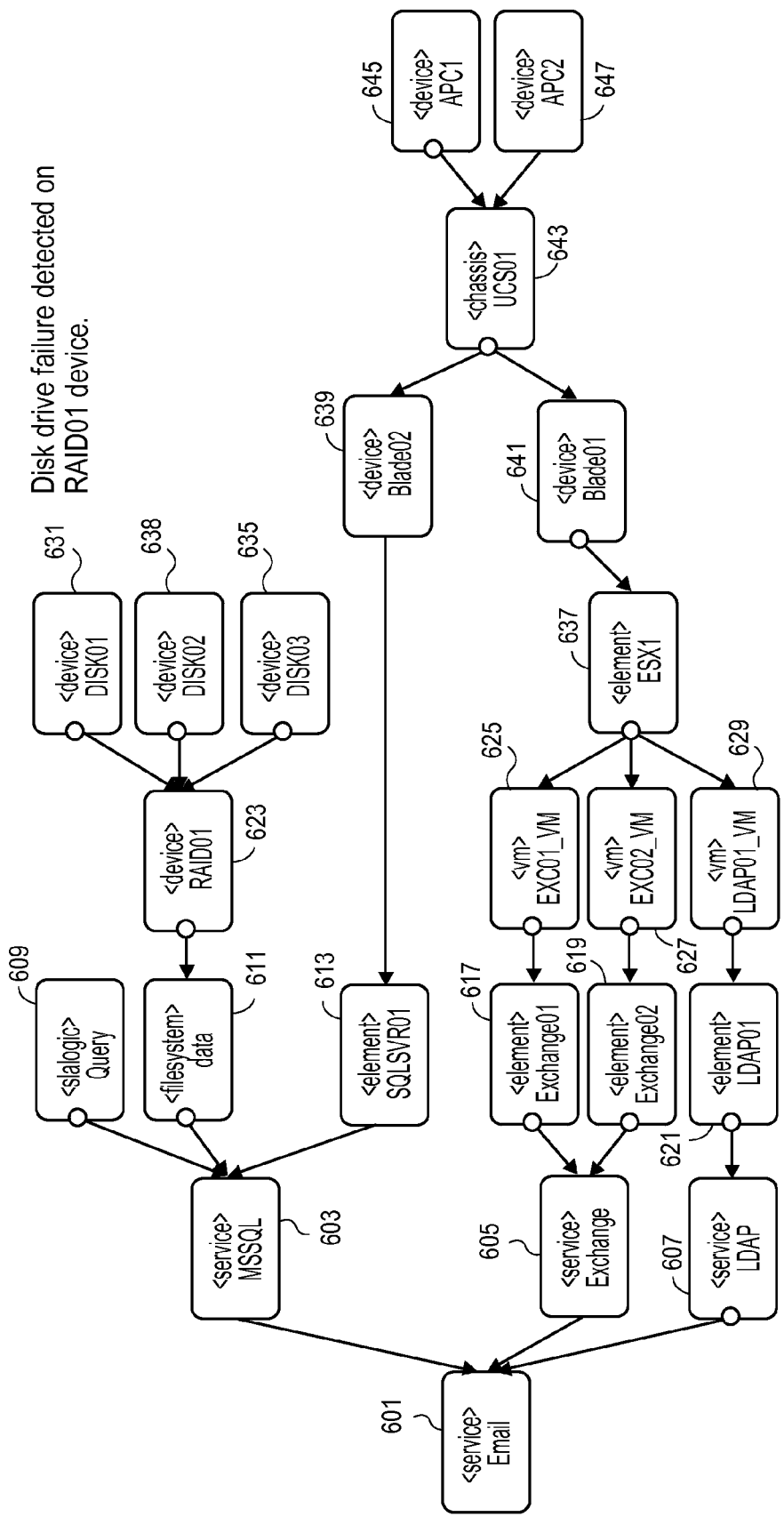
Figure 6H:
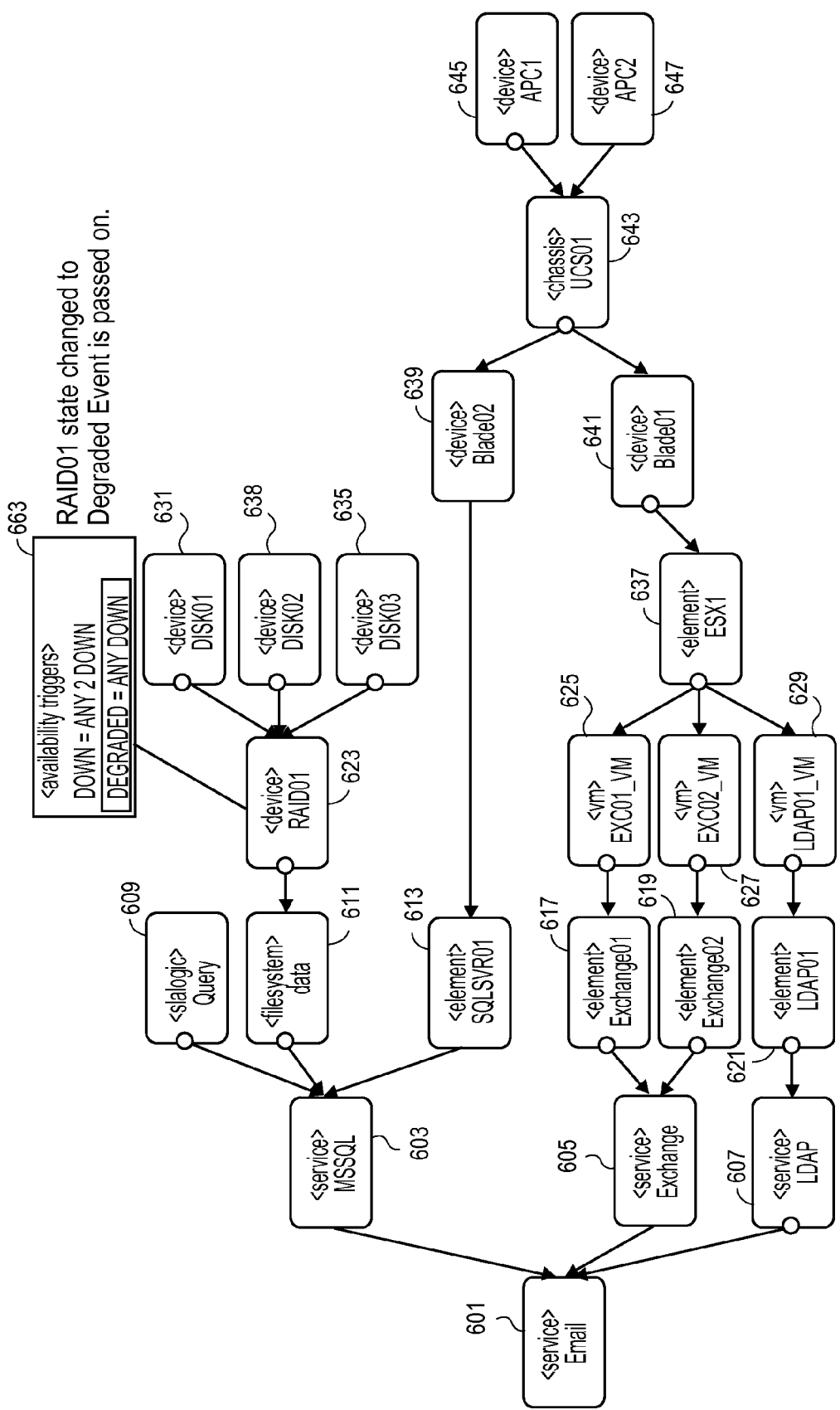
Figure 6I:
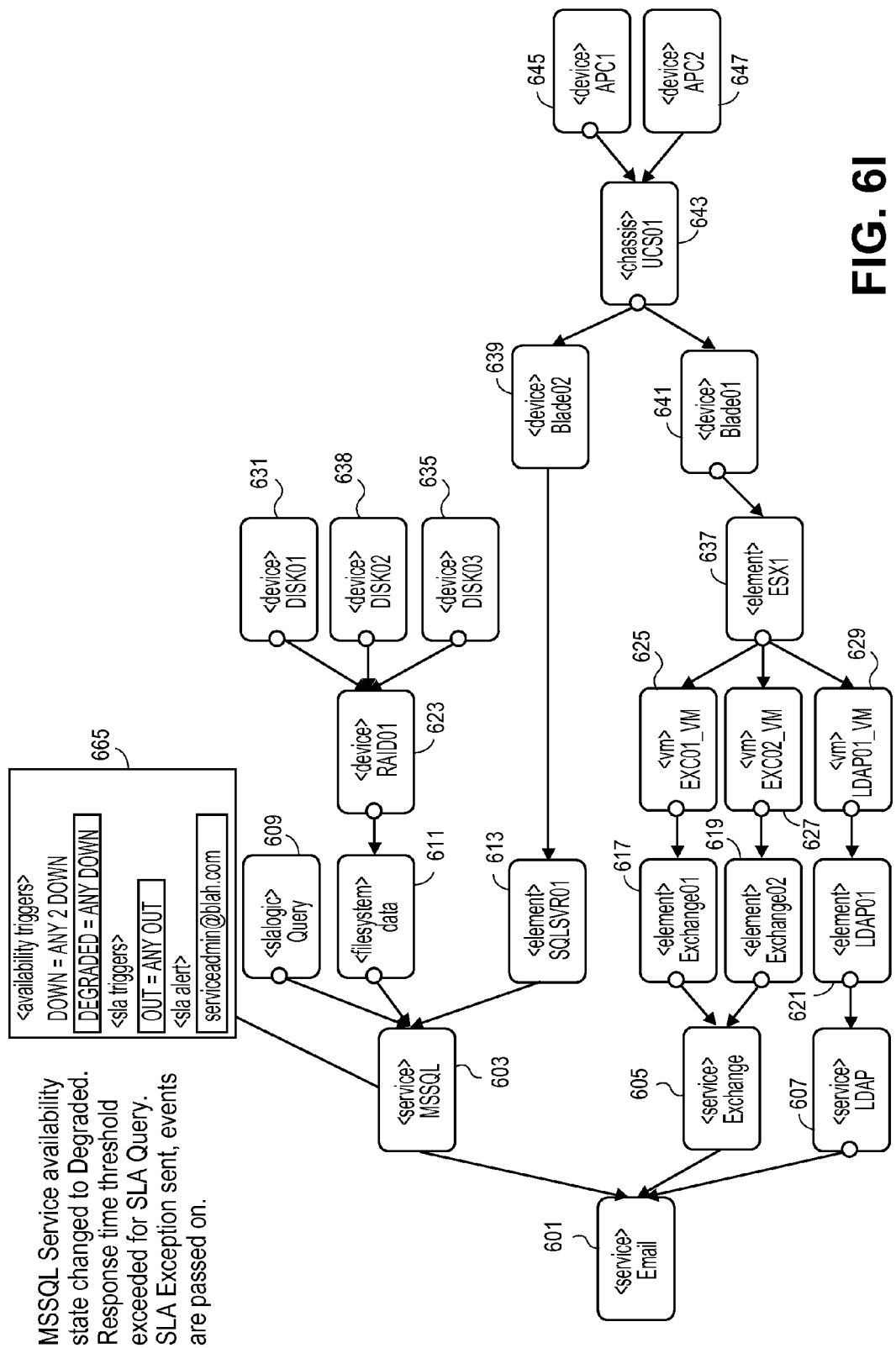
Figure 6J:
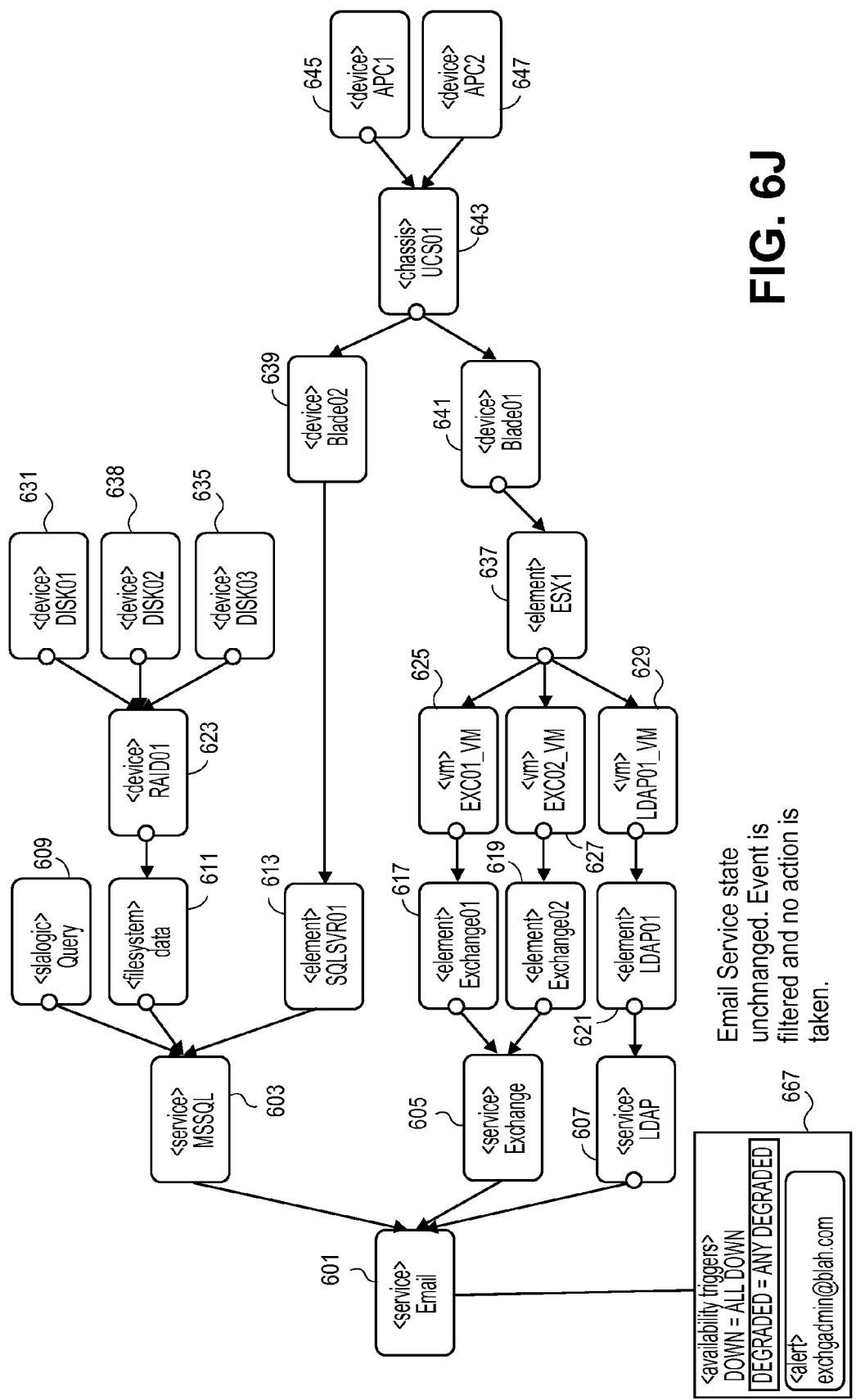

In FIG. 6G, a new failure occurs on the MSSQL subservice 603 tree: a disk drive failure is detected on a device 631 of the RAID01 device (event is device down). In FIG. 6H, that causes a policy 663 violation of the RAID controller device 623, the availability state of the RAID controller 623 changed, and the event is forwarded to the filesystem data 611. In FIG. 6I, the compliance state of the RAID controller 623 is measured because there is defined an element on the tree which is an SQL query 603—a synthetic transaction 665 against the MSSQL service 603 itself (for example, the MSSQL service generates a request and the response time of the result set is measured and scored). The service is designated as out of compliance by the drive failure as measured by the MSSQL service 603. There is thus a dual state change here, in which there is a compliance state change and an availability state change. These are completely separate determinations, and different notifications can be made based on the type of state change event that has occurred. These are events that are rolled up the MSSQL service 603 to the e-mail service 601 (in FIG. 6J). However, the state of the E-mail Service 601 element is already degraded, so that additional event does not cause a state change of the E-mail Service 601 element per the policy 667 (661 in FIG. 6F). No action is taken and no additional event is generated, which essentially filters out the degraded event.

Figure 6K:
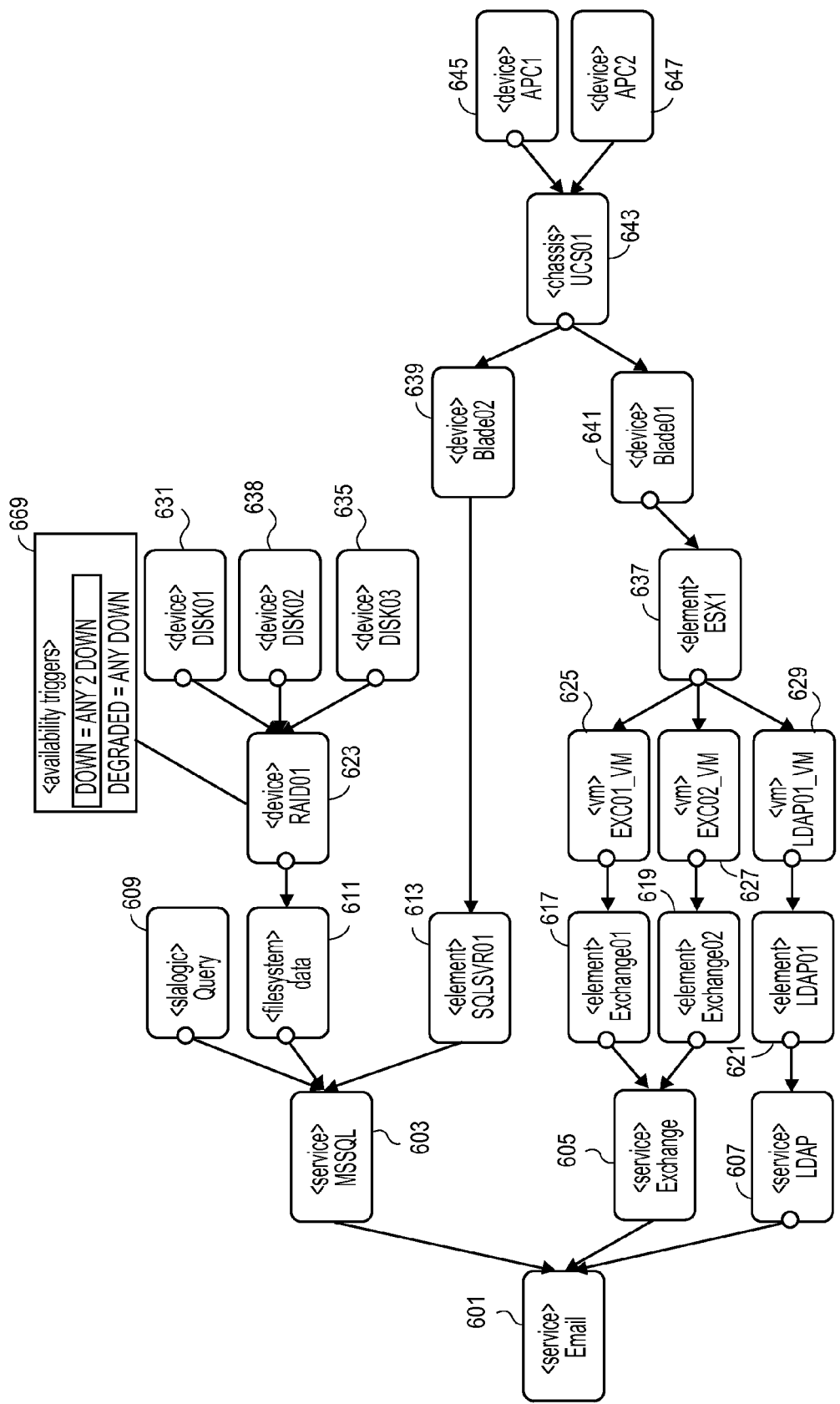
Figure 6L:
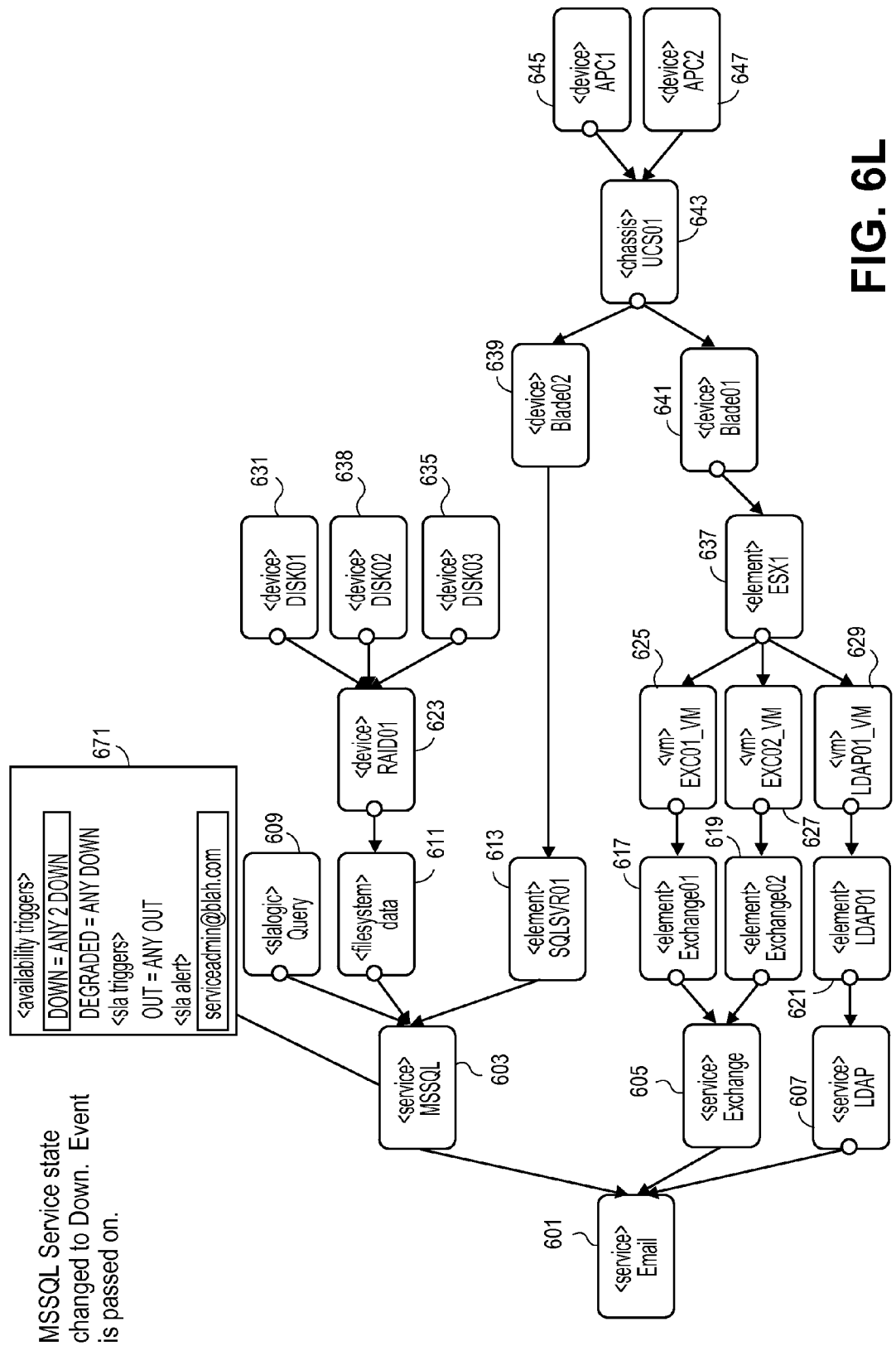
Figure 6M:
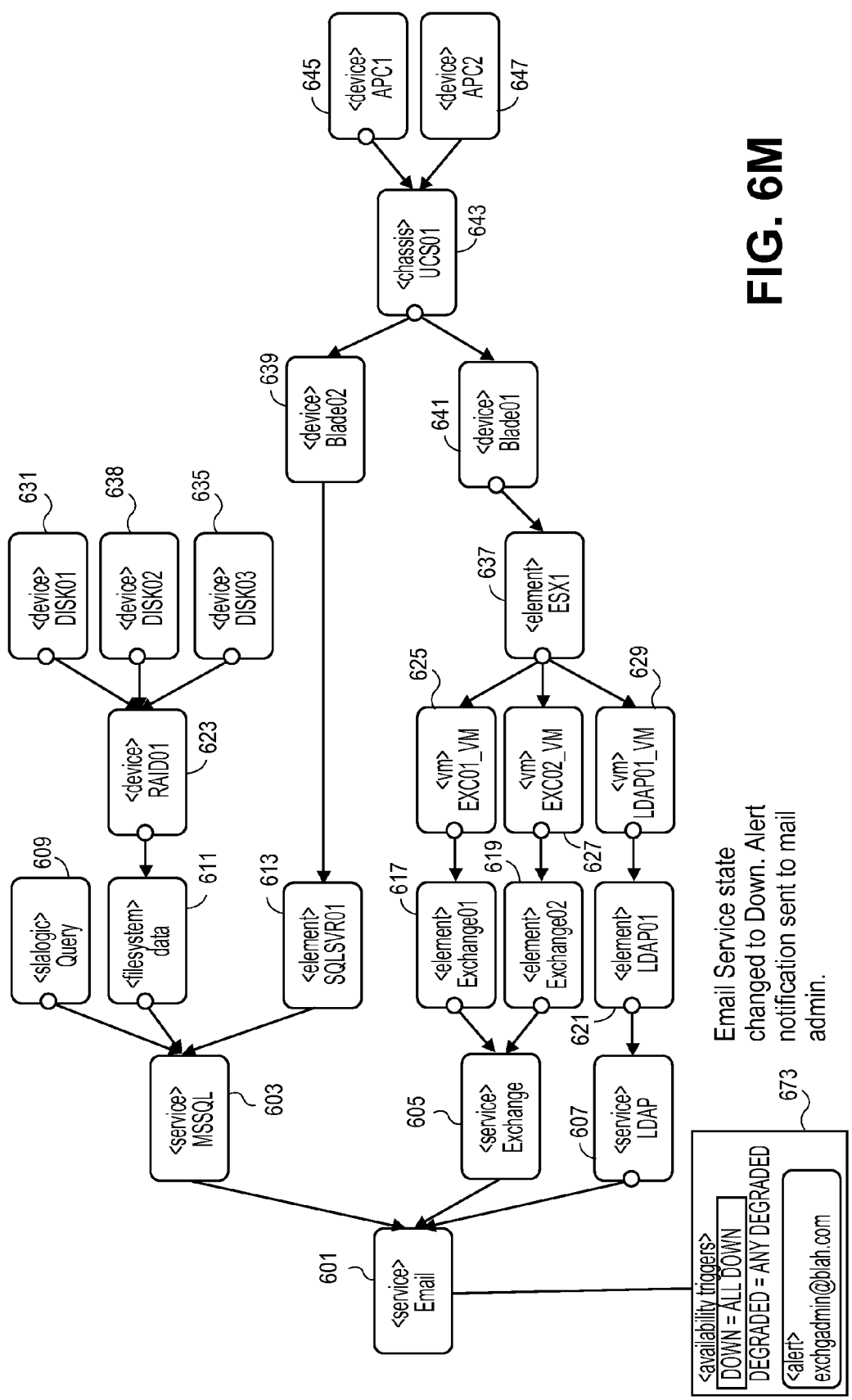

In FIG. 6K, there is a second drive failure, in which the RAID controller 623 has failed, causing a state change event indicating that the state of the RAID drive 623 element is changed to down and an event is passed to the element's parent. In FIG. 6L, the MSSQL service 603 state is change to down, and this event is processed per its policy 671. At this point, this event (MSSQL Service is down) is processed against the E-mail Service element 601 (see FIG. 6M), which has a policy 673 (667 in FIG. 6J, 661 in FIG. 6F) stating that if the MSSQL Service is down, the E-mail Service is also down. That is, E-mail Services can no longer be provided. Another notification is sent to the administrator that the E-mail Service is no longer "degraded", it has become "down".

In general, this example shows how the molecular policy does roll-up, aggregation, masking and filtering of complex sets of events. In this particular example implementation, an event can occur on any underlying application, and when an application moves to a completely different host, e.g., ESX02, and this impact evaluation can be performed without having to reprogram the system or even account for the fact that ESX02 now appears in the dependency tree. The state calculation happens despite the change to a different host.

Figure 7:
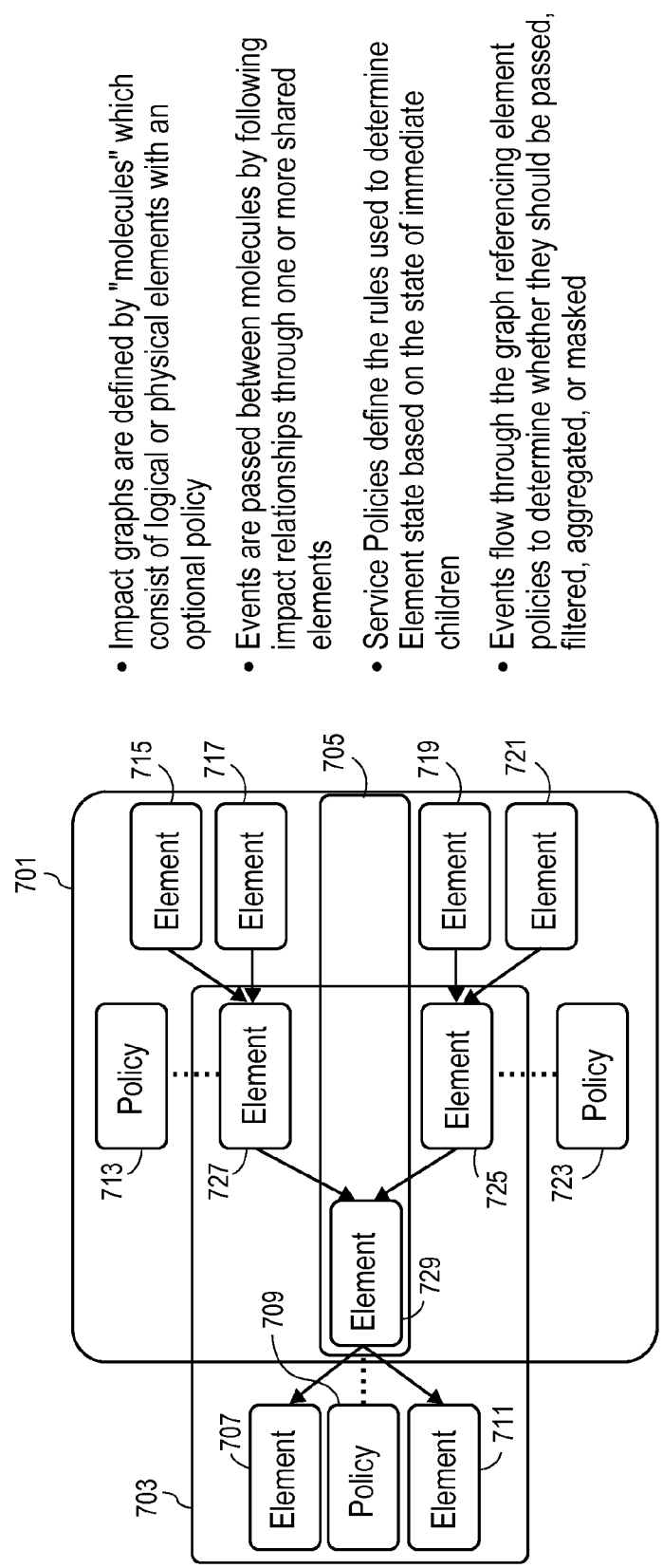

Referring now to FIG. 7, a relationship diagram illustrating impact management, elements, policies, and event flow will be discussed and described. This defines how impact graphs work. Impact graphs are defined by "molecules" which consist of logical or physical elements with an optional policy. Events are passed between molecules by following impact relationships through one or more shared elements. Service policies define the rules used to determine element state based on the state of an element's immediate children. Events flow through the graph, referencing element policies to determine whether they should be passed, filtered, aggregated, or masked.

A construct called a molecule 701, 703, 705 is defined, the molecule being an array of logical or physical elements 707, 711, 715, 717, 719, 721, 725, 727, 729 with optional policies 709, 713, 723 that are attached which define how their state is interpreted based on the state of their children. In this example, the state of an element is passed up the graph into a top level tree through these shared elements at any particular node point. The illustrated molecules 701, 703, 705 can be overlaid for example at various points in FIG. 6, and these events can be passed through. Service policies define the rules; events are passed through the molecules, eventually reaching the tree, as illustrated.

Referring now to FIG. 8, a block diagram illustrating concepts relating to impact elements will be discussed and described. Types of elements include physical elements 801, logical elements 803, virtual elements 805, and reference elements 807.

Physical elements 801 represent the physical system, infrastructure and network devices which a service relies on. Physical elements are systems infrastructure, network devices, servers, blades, storage arrays, switches, and the like, which are physical pieces of hardware.

Logical elements 803 represent aspects of a service that must be measured or evaluated as a set to determine a state. Logical elements are clusters of separately executable and definable applications (for example, app clusters), synthetic transactions which are executed to take measurements (such as SLA transactions), process monitors (such as health monitors), and the like.

Virtual elements 805 consist of the software components that make up a service such as an operation system or an application instance. Virtual elements include virtual machine instances, individual separately executable applications, operating systems, and the like.

Reference elements 807 provide a link to dependencies managed by an external instance of the management system capable of propagating state information; the reference elements enable scale through federated management of segmented or geographically dispersed data centers. Reference elements cover multiple elements and are a proxy for a state condition which allows the user to tie impact graphs across multiple physical instances of the underlying network or database.

Figure 9:
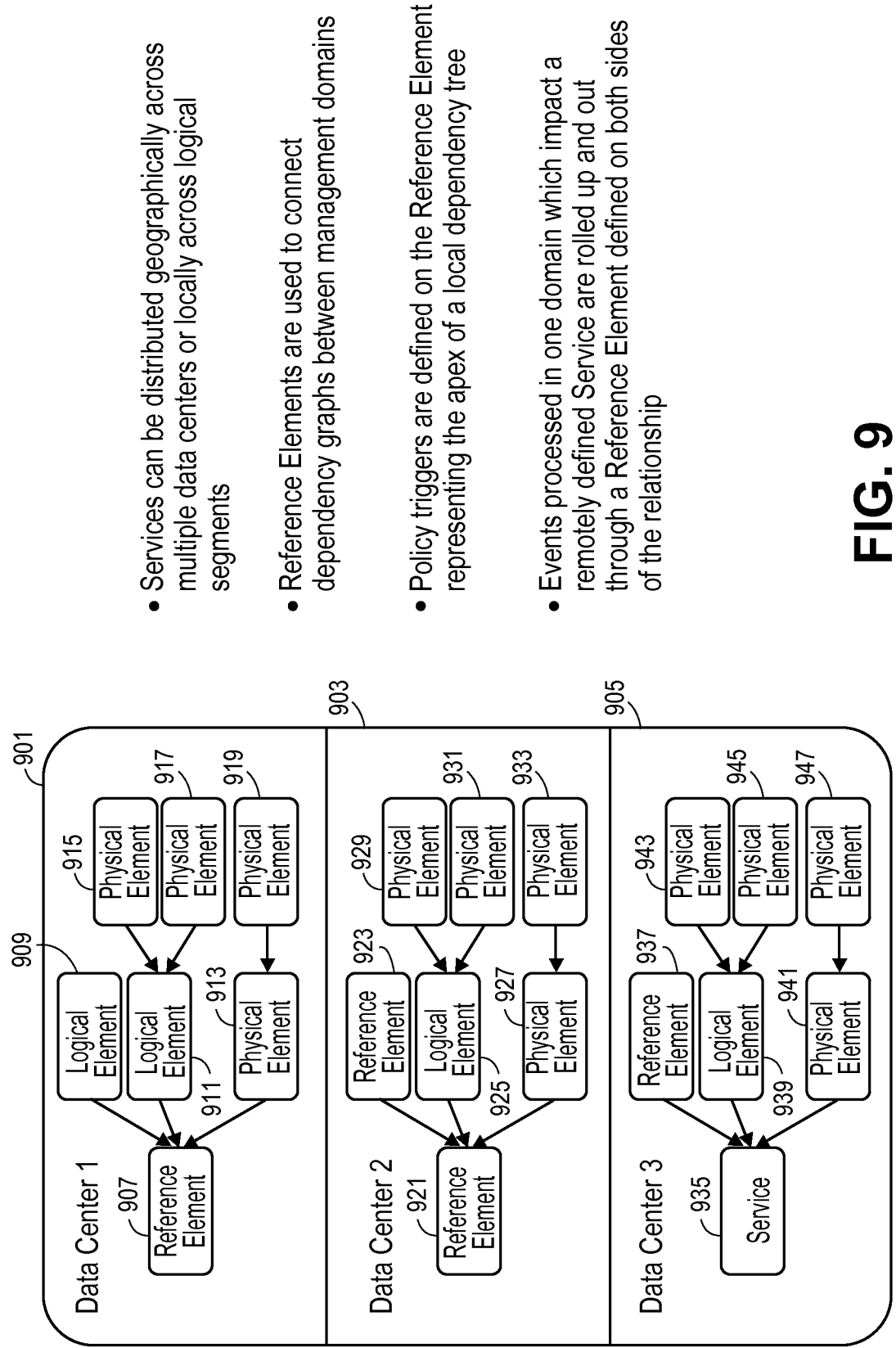

Referring now to FIG. 9, a block diagram illustrating concepts relating to data centers and distributed impact management will be discussed and described. Services can be distributed geographically across multiple data centers or locally across logical segments. Reference elements can be used to connect dependency graphs between management domains. Policy triggers are defined on the reference element 907, 921 representing the apex of a local dependency tree. Events processed in one domain which impact a remotely defined service are rolled up and out through a reference element 907-923, 921-937, defined on both sides of the relationship.

Here, there are three physical data centers 901, 903, 905. Each of the data centers supports a particular service 935. As impact events occur in each data center 901, 903, they roll up to the top node which is the reference element 907, 921, respectively; and the state is passed across to the remote instances 923, 937, respectively, and each remote instance 923, 937 has a graph defining a state proxy. As that proxy changes state, that is injected into the remote impact graph and then rolled up in the remote impact graph. An impact event that occurs half way around the world can affect the service at the local data center.

A reference element 907, 923, 927, 921, 937 is a user-defined collection of physical, logical, and/or virtual elements 909-919, 925-933, 939-947. For example, the user can define a collection of infrastructure such as a disaster recovery data center. If a major failure occurs in the reference element, which this collection of infrastructure that constitutes the disaster recovery data center, the user requires to be notified. The way to know that is to tie multiple disparate instances of the system together as a reference element and to have a policy that calls for notifying the user if the reference element has a negative availability event or a negative compliance event.

A virtual element is one of a service, operating system, or virtual machine.

A logical element is a collection of user-defined measures (commonly referred to in the field as a synthetic transaction). For example, a service (such as a known outside service) can make a request and measure the response time. The response time measurement is listed in the graph as a logical element. The measurement can measure quality, availability, and/or any arbitrary parameter that the user considers to be important (e.g., is the light switch on). The logical element can be scripted to measure a part of the system, to yield a measurement result. Other examples of logical elements include configuration parameters, where the applications exist, processes sharing a process, e.g., used for verifying E-Commerce applications, which things are operating in the same processing space, which things are operating in the same networking space, encryption of identifiers, lack of storing of encrypted identifiers, and the like.

A physical element can generate an event in accordance with known techniques, e.g., the physical element (a piece of hardware) went down or is back on-line.

A reference element can generate an event when it has a state change which is measured through an impact analysis.

A virtual element can generate an event in accordance with known techniques, for example, an operating system, application, or virtual machine has defined events which it generates according to conventional techniques.

A logical element can generate an event when it is measured, in accordance with known techniques.

Referring now to FIG. 10, a discussion of service management will be further discussed and described. This figure discusses some of the possible points from the present method and system.

The present system and method can quickly represent a customer application as a managed object, as simple as specifying devices and service dependencies. This can be easy to extend with relationships such as clusters and load balanced web tiers, and can be precise where need be.

Also, the system and method can group infrastructure components used by a customer application, using relationships to identify exactly what virtualization hosts, storage, and Cisco UCS server hardware is supporting the service; can provide "swim lane" visualization for rapid understanding; can track infrastructure changes automatically and records change events; and can identify potential hot spots.

Also, the system and method aids understanding of service availability and infrastructure dependencies: it rolls up dependency and infrastructure status and presents one view of the service availability, the user can view status of every service element and supporting infrastructure device at one, and the impact view shows which customers depend on particular infrastructure components.

Referring now to FIG. 11, a discussion of root cause for dynamic impact and event management will be further discussed and described. The method and system can provide service-specific notification: service-focused change events—status, membership, infrastructure; and customers can register for the services they care about.

Also, the system can provide fast root cause identification: service status events include analyzed root cause, it can identify failure to the device or dependent service, and can provide infrastructure and dependency visualizations. Further, the system can eliminate redundant alarms automatically: it can simplify alarming with integrated masking, aggregation, and filtering; it can provide multiple availability checks per device with built-in windowing; and it can notify once per service status change instead of hundreds of times on individual device events.

Referring now to FIG. 12, a discussion relating to managing to service agreements will be further discussed and described. The method and system can provide a way to manage to service agreements. For example, the user can define and manage service availability in customer terms: planned up times for applications, e.g., 24×7, M-F 8-5, etc.; and can define whether a service is up, degraded or down. Also, the system can notify customers at the beginning and end of unexpected outages; this can build satisfaction with effective communications. Further, the system can provide regular reports, e.g., weekly, monthly, quarterly service availability reports; and/or incident reports showing affected time and identifying incident root cause.

Figure 13:
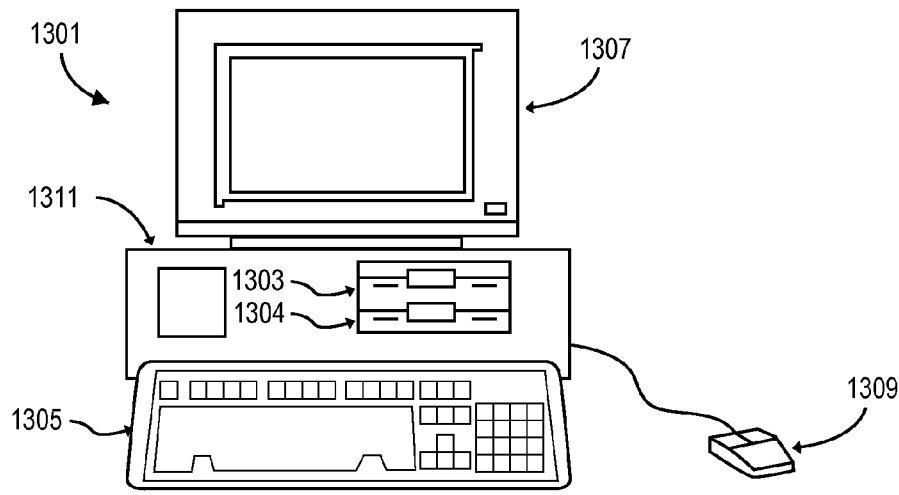
FIG. 13 and FIG. 14 illustrate computers of a type suitable for implementing and/or assisting in the implementation of the processes described herein.
Figure 14:
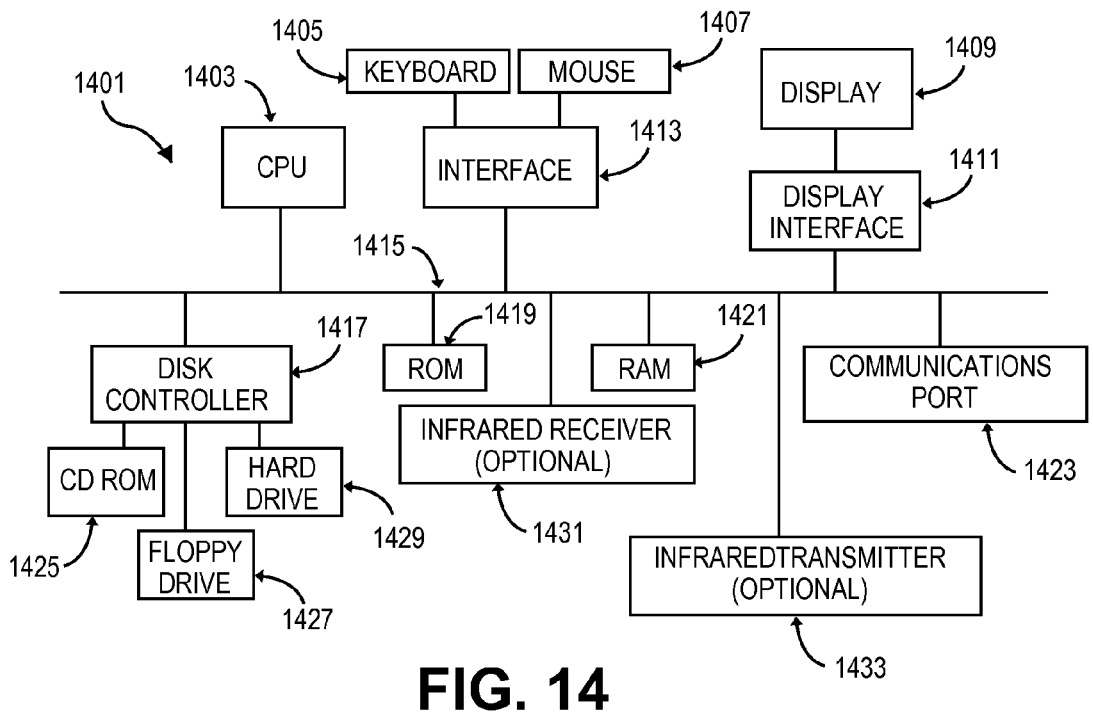

Referring now to FIG. 13 and FIG. 14, a computer of a type suitable for implementing and/or assisting in the implementation of the processes described herein will now be discussed and described. Viewed externally in FIG. 13, a computer system designated by reference numeral 1301 has a central processing unit 1311 having disk drives 1303, 1304. Disk drive indications 1303, 1304 are merely symbolic of a number of disk drives which might be accommodated by the computer system. Typically these would include a floppy disk drive such as 1303, a hard disk drive (not shown externally) and a CD ROM or digital video disk indicated by slot 1304. The number and type of drives varies, typically with different computer configurations. Disk drives 1303 and 1304 are in fact options, and for space considerations, may be omitted from the computer system used in conjunction with the processes described herein.

The computer can have a display 1307 upon which information is displayed. The display is optional for the network of computers used in conjunction with the system described herein. A keyboard 1305 and a pointing device 1309 such as mouse will be provided as input devices to interface with the central processing unit 1311. To increase input efficiency, the keyboard 1305 may be supplemented or replaced with a scanner, card reader, or other data input device. The pointing device 1309 may be a mouse, touch pad control device, track ball device, or any other type of pointing device.

FIG. 14 illustrates a block diagram of the internal hardware of the computer of FIG. 13. A bus 1415 serves as the main information highway interconnecting the other components of the computer 1401. CPU 1403 is the central processing unit of the system, performing calculations and logic operations required to execute a program. Read only memory (ROM) 1419 and random access memory (RAM) 1421 may constitute the main memory of the computer 1401.

A disk controller 1417 can interface one or more disk drives to the system bus 1415. These disk drives may be floppy disk drives such as 1427, a hard disk drive (not illustrated) or CD ROM or DVD (digital video disk) drives such as 1425, internal or external hard drives 1429, and/or removable memory such as a USB flash memory drive. These various disk drives and disk controllers may be omitted from the computer system used in conjunction with the processes described herein.

A display interface 1411 permits information from the bus 1415 to be displayed on the display 1409. A display 1409 is also an optional accessory for the network of computers. Communication with other devices can occur utilizing communication port 1423 and/or a combination of infrared receiver (optional) 1431 and infrared transmitter (optional) 1433.

In addition to the standard components of the computer, the computer can include an interface 1413 which allows for data input through the keyboard 1405 or pointing device such as a mouse 1407, touch pad, track ball device, or the like.

Figure 15A:
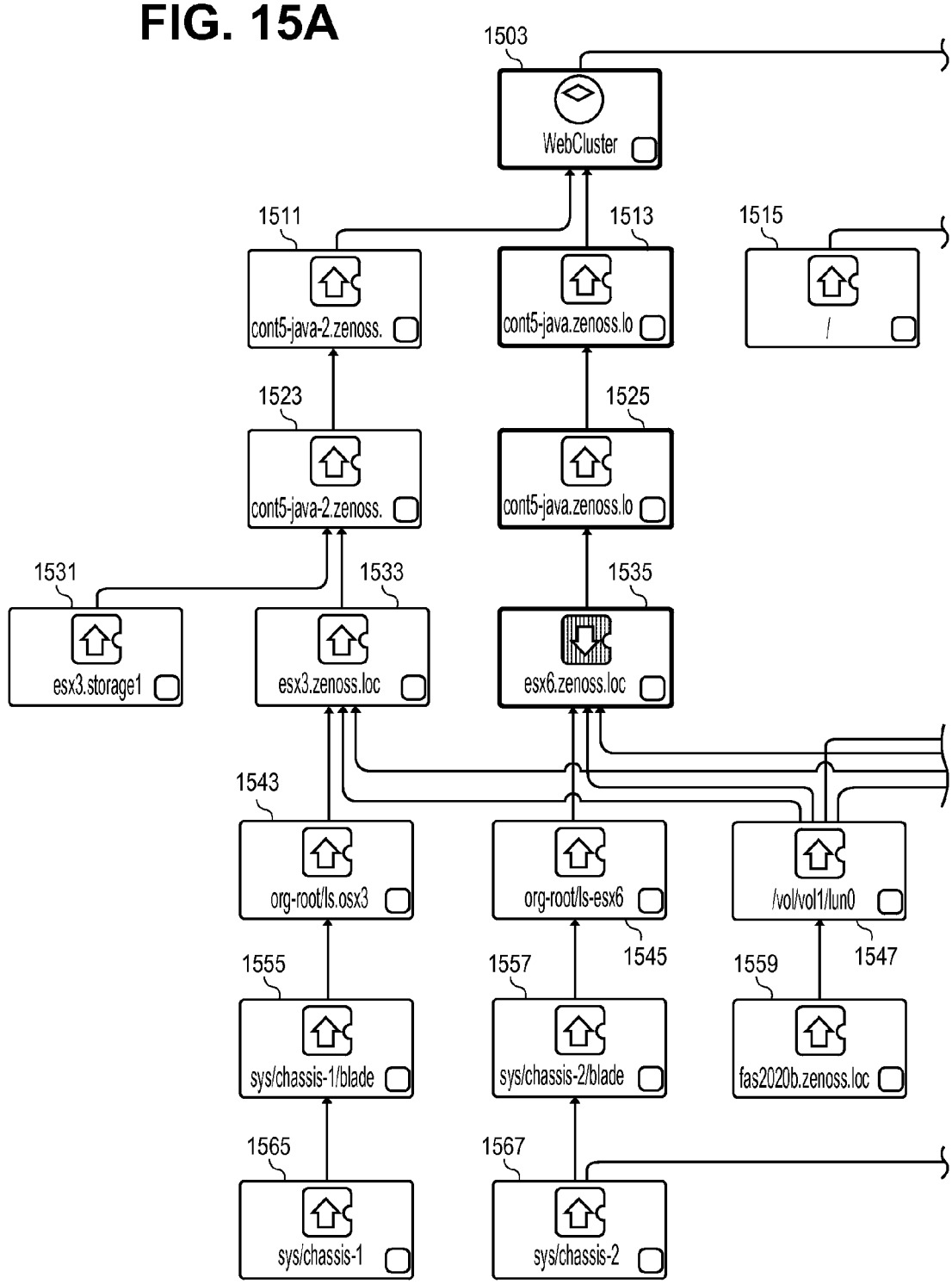
FIG. 15A to FIG. 15B are a screen shot of a dependency tree.
Figure 15B:
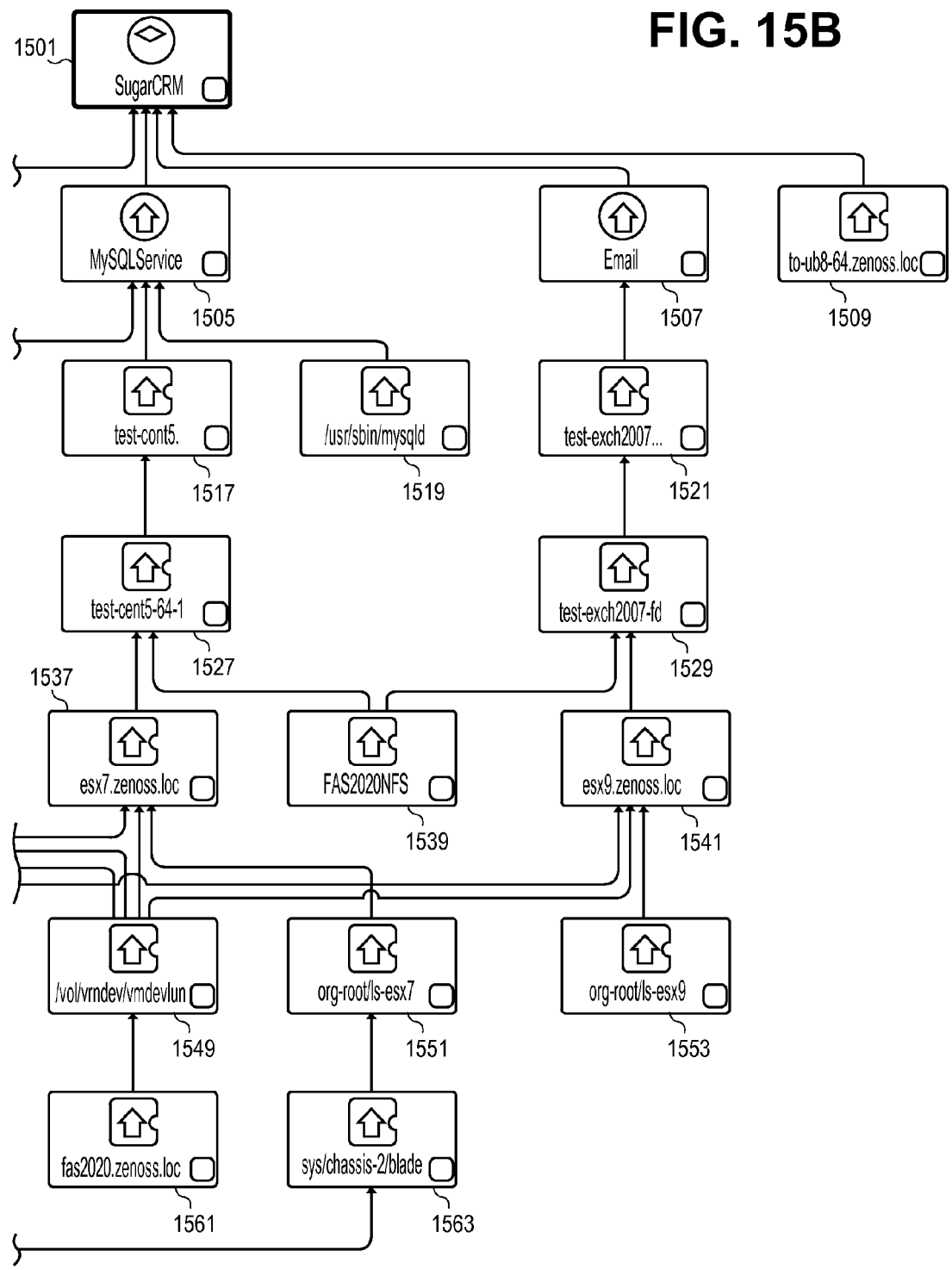

Referring now to FIG. 15A to FIG. 15B, a screen shot of a dependency tree will be discussed and described. The dependency tree is spread over two drawing sheets due to space limitations. Here, an event has occurred at the esx6.zenoss.loc service 1535 (with the down arrow). That event rolls up into the virtual machine cont5-java.zenoss.loc 1525, i.e., the effect of the event on the parents (possibly up to the top of the tree). That event (server down) is forwarded into the event queue, at which point the element which has a dependency on esx6 (cont5-java.zenoss.loc 1525, illustrated above the esx6 server 1535) will start to process that event against its policy. Each of the items illustrated here in a rectangle is an element 1501-1567. The parent/child relationships are stored in the dependency table (see FIG. 2).

FIG. 2 is the schema in which all of these relationships can be stored, in a format of a traditional relational database for ease of discussion. In this schema, there might be an element right above the esx6 server 1535, which in this example is a virtual machine cont5-java.zenoss.loc 1525. In the dependency table (FIG. 2), the child ID of the virtual machine cont5-java.zenoss-loc is "esx6.zenoss.loc". The event occurs on the element ID for esx6, perhaps causing the esx6 server to be down, then the parents of the element are obtained (1525), and the event is processed for the parents (child is down). The rules associated with the parent IDs can be obtained, the event processed, and it can be determined whether the event causes a state change for the parent 1525. Referring back to FIG. 1, if there is a state change because the child state changed and the rule results in a new state for the immediate parent, this new event is posted and passed to the queue. After that, the new event (a state change for this particular element) is processed and handled as outlined above.

In FIG. 15A to FIG. 15B, the server esx6 1535 is an element. The server esx6 went down, which is the event for the esx6 element. The event is placed into the queue. The dependencies are pulled up, which are the parents of the esx6 element (i.e., roll-up to the parent), here cont5-java.zenoss-.loc 1525; the rules for cont5-java.zenossloc are processed with the event; if this is a change that cause an event, the event is posted and passed to the queue e.g., to con15-java.zenossloc 1513; if there is no event caused, then no event is posted and there is no further roll-up.

Procedures described herein can advantageously be implemented on, for example, a processor of a controller, described in connection with FIG. 3 or other apparatus appropriately arranged.

The detailed descriptions which appear above may be presented in terms of program procedures executed on a computer or network of computers. These procedural descriptions and representations herein are the means used by those skilled in the art to most effectively convey the substance of their work to others skilled in the art.

Further, this invention has been discussed in certain examples as if it is made available by a provider to a single customer with a single site. The invention may be used by numerous customers, if preferred. Also, the invention may be utilized by customers with multiple sites and/or agents and/or licensee-type arrangements.

The system used in connection with the invention may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

It should be noted that the term "computer system" or "computer" used herein denotes a device sometimes referred to as a computer, laptop, personal computer, personal digital assistant, personal assignment pad, server, client, mainframe computer, or equivalents thereof provided such unit is arranged and constructed for operation with a data center.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

The term "data center" is intended to include definitions such as provided by the Telecommunications Industry Association as defined for example, in ANSI/TIA-942 and variations and amendments thereto, the German Datacenter Star Audi Programme as revised from time-to-time, the Uptime Institute, and the like.

It should be noted that the term infrastructure device or network infrastructure device denotes a device or software that receives packets from a communication network, determines a next network point to which the packets should be forwarded toward their destinations, and then forwards the packets on the communication network. Examples of network infrastructure devices include devices and/or software which are sometimes referred to as servers, clients, routers, edge routers, switches, bridges, brouters, gateways, media gateways, centralized media gateways, session border controllers, trunk gateways, call servers, and the like, and variants or evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A monitor device that determines a status of a service, comprising:
   a processor that
   provides a dependency tree representing (i) relationships among all the infrastructure elements in a computer system that are related to delivery of a service by a computer system, and (ii) how the infrastructure elements interact with each other in a delivery of said service, wherein a state of an infrastructure element is impacted only by states among its immediately dependent infrastructure elements of the dependency tree; and
   determines the state of the service by checking current states of infrastructure elements in the dependency tree that immediately depend from the service,
   wherein the infrastructure elements include:
   the service;
   a physical element that generates an event caused by a pre-defined physical change in the physical element;
   a logical element that generates an event when it has a pre-defined characteristic as measured through a synthetic transaction;
   a virtual element that generates an event when a predefined condition occurs; and
   a reference element that is a pre-defined collection of other different elements among the same dependency tree, for which a single policy is defined for handling an event that occurs within the reference element.

2. The monitor device of claim 1, wherein the processor
   receives an infrastructure event in relation to one of the infrastructure elements in a computer system;
   determines whether the infrastructure event is propagated through the dependency tree to have an impact on said service;
   cancels a change to the state of the service, when the infrastructure event does not have an impact on current states of the infrastructure elements in the dependency tree that immediately depend from the service; and
   updates the state of the service, when the infrastructure event is propagated up to have an impact on said service.

3. The monitor device of claim 2, wherein
   the processor provides a notification of the status of the service together with the infrastructure event indicated as a root cause of the status of the service, to a registered user that previously registered for notification regarding the service.

4. The monitor device of claim 2, wherein
   the infrastructure event is a physical event and the infrastructure element is the physical element at a leaf node of the dependency tree.

5. The monitor device of claim 1, wherein
   an implied state of one of the infrastructure elements in the dependency tree is defined by a current state of one or more elements directly related to it;
   an absolute state of one of the infrastructure elements is rolled up to direct parent elements of the one of the elements, based on policies which determine the element state from absolute calculations, when a physical event occurs which changed the absolute state of the one of the elements.

6. The monitor device of claim 1, wherein
   states indicated for the infrastructure element include: up, down and degraded,
   "up" indicates a normally functional state, "down" indicates a non-functional state, and "degraded" indicates a state which is available and not fully functional.

7. The monitor device of claim 1, wherein
   states indicated for the infrastructure element include both:
   (i) availability states of up, down, degraded;
   "up" indicates a normally functional state, "down" indicates a non-functional state, and "degraded" indicates a state which is available and not fully functional; and
   (ii) compliance states of at least in compliance, and out of compliance
   with respect to results from a synthetic test performed on the infrastructure element.

8. The monitor device of claim 1, wherein
   a molecule is a pre-defined as an array of infrastructure elements among the same dependency tree, and
   the processor sends a single notification of the status with respect to plural state changes within the molecule resulting from a same root cause event.

9. The monitor device of claim 1, wherein
the processor determines the state of the infrastructure element according to an absolute calculation specified in a policy assigned to the infrastructure element, the calculation references the current state of the infrastructure element's immediately dependent infrastructure element.

10. A computer-implemented method for determining a status of a service, comprising:
providing, in a computer processor device, a dependency tree representing (i) relationships among all the infrastructure elements in a computer system that are related to delivery of a service by a computer system, and (ii) how the infrastructure elements interact with each other in a delivery of said service, wherein a state of an infrastructure element is impacted only by states among its immediately dependent infrastructure elements of the dependency tree; and
determining, in the computer processor device, the state of the service by checking current states of infrastructure elements in the dependency tree that immediately depend from the service,
wherein the infrastructure elements include:
the service;
a physical element ha generates an event caused by a pre-defined physical change in the physical element;
a logical element that generates an event when it as a pre-defined characteristic as measured through a synthetic transaction;
a virtual element that generates an event when a predefined condition occurs; and
a reference element that is a pre-defined collection of other different elements among the same dependency tree, for which a single policy is defined for handling an event that occurs within the reference element.

11. The method of claim 10, further comprising
receiving, in the computer processor device, an infrastructure event in relation to one of the infrastructure elements in a computer system;
determining, in the computer processor device, whether the infrastructure event is propagated through the dependency tree to have an impact on said service;
canceling, in the computer processor device, a change to the state of the service, when the infrastructure event does not have an impact on current states of the infrastructure elements in the dependency tree that immediately depend from the service; and
updating, in the computer processor device, the state of the service, when the infrastructure event is propagated up to have an impact on said service.

12. The method of claim 11, further comprising
providing, in the computer processor device, a notification of the status of the service together with the infrastructure event indicated as a root cause of the status of the service, to a registered user that previously registered for notification regarding the service.

13. The method of claim 11, wherein
the infrastructure event is a physical event and the infrastructure element is the physical element at a leaf node of the dependency tree.

14. The method of claim 10, further comprising
defining, in the computer processor device, an implied state of one of the infrastructure elements in the dependency tree by a current state of one or more elements directly related to it;
rolling up, in the computer processor device, an absolute state of one of the infrastructure elements to direct parent elements of the one of the elements, based on policies which determine the element state from absolute calculations, when a physical event occurs which changed the absolute state of the one of the elements.

15. The method of claim 10, wherein
states indicated for the infrastructure element include: up, down and degraded,
"up" indicates a normally functional state, "down" indicates a non-functional state, and "degraded" indicates a state which is available and not fully functional.

16. The method of claim 10, wherein
states indicated for the infrastructure element include both:
(i) availability states of up, down, degraded;
"up" indicates a normally functional state, "down" indicates a non-functional state, and "degraded" indicates a state which is available and not fully functional; and
(ii) compliance states of at least in compliance, and out of compliance with respect to results from a synthetic test performed on the infrastructure element.

17. The method of claim 10, wherein a molecule is a pre-defined as an array of infrastructure elements among the same dependency tree, further comprising
sending, in the computer processor device, a single notification of the status with respect to plural state changes within the molecule resulting from a same root cause event.

18. The method of claim 10,
the computer processor device determines the state of the infrastructure element according to an absolute calculation specified in a policy assigned to the infrastructure element, the calculation references the current state of the infrastructure element's immediately dependent infrastructure element.

19. A non-transitory computer-readable medium comprising instructions being execute by a computer, the instructions including a computer-implemented method for determining a status of a service, the instructions implement:
providing, in a computer processor device, a dependency tree representing (i) relationships among all the infrastructure elements in a computer system that are related to delivery of a service by a computer system, and (ii) how the infrastructure elements interact with each other in a delivery of said service, wherein a state of an infrastructure element is impacted only by states among its immediately dependent infrastructure elements of the dependency tree; and
determining, in the computer processor device, the state of the service by checking current states of infrastructure elements in the dependency tree that immediately depend from the service,
wherein the infrastructure elements include:
the service;
a physical element that generates an event caused by a pre-defined physical change in the physical element;
a logical element that generates an event when it has a pre-defined characteristic as measured through synthetic transaction;
a virtual element that generates an event when a predefined condition occurs; and
a reference element that is a pre-defined collection of other different elements among the same dependency tree, for which a single policy is defined for handling an event that occurs within the reference element.

20. The non-transitory computer-readable medium of claim 19, further comprising receiving, in the computer processor device, an infrastructure event in relation to one of the infrastructure elements in a computer system;

determining, in the computer processor device, whether the infrastructure event is propagated through the dependency tree to have an impact on said service;

canceling, in the computer processor device, a change to the state of the service, when the infrastructure event does not have an impact on current states of the infrastructure elements in the dependency tree that immediately depend from the service; and updating, in the computer processor device, the state of the service, when the infrastructure event is propagated up to have an impact on said service.

21. The non-transitory computer-readable medium of claim 20, further comprising providing, in the computer processor device, a notification of the status of the service together with the infrastructure event indicated as a root cause of the status of the service, to a registered user that previously registered for notification regarding the service.

22. The non-transitory computer-readable medium of claim 20, wherein the infrastructure event is a physical event and the infrastructure element is the physical element at a leaf node of the dependency tree.

23. The non-transitory computer-readable medium of claim 19, further comprising defining, in the computer processor device, an implied state of one of the infrastructure elements in the dependency tree by a current state of one or more elements directly related to it;

rolling up, in the computer processor device, an absolute state of one of the infrastructure elements to direct parent elements of the one of the elements, based on policies which determine the element state from absolute calculations, when a physical event occurs which changed the absolute state of the one of the elements.

24. The non-transitory computer-readable medium of claim 19, wherein states indicated for the infrastructure element include: up, down and degraded, "up" indicates a normally functional state, "down" indicates a non-functional state, and "degraded" indicates a state which is available and not fully functional.

25. The non-transitory computer-readable medium of claim 19, wherein states indicated for the infrastructure element include both:
(i) availability states of up, down, degraded;

"up" indicates a normally functional state, "down" indicates a non-functional state, and "degraded" indicates a state which is available and not fully functional; and (ii) compliance states of at least in compliance, and out of compliance with respect to results from a synthetic test performed on the infrastructure element.

26. The non-transitory computer-readable medium of claim 19, wherein a molecule is a pre-defined as an array of infrastructure elements among the same dependency tree, further comprising sending, in the computer processor device, a single notification of the status with respect to plural state changes within the molecule resulting from a same root cause event.

27. The non-transitory computer-readable medium of claim 19, further comprising determining the state of the infrastructure element according to an absolute calculation specified in a policy assigned to the infrastructure element, the calculation references the current state of the infrastructure element's immediately dependent infrastructure element.

* * * * *